United States Patent [19]
Sai et al.

[11] Patent Number: 5,583,405
[45] Date of Patent: Dec. 10, 1996

[54] AUTOMATIC DOOR OPENING AND CLOSING SYSTEM

[75] Inventors: Masahiro Sai, Akashi; Koji Tsutsumi, Kobe, both of Japan

[73] Assignee: Nabco Limited, Japan

[21] Appl. No.: 513,262

[22] Filed: Aug. 10, 1995

[30] Foreign Application Priority Data

Aug. 11, 1994 [JP] Japan ................................ 6-211921
Sep. 26, 1994 [JP] Japan ................................ 6-257479

[51] Int. Cl.⁶ .......................... E05F 15/14; E05F 15/20
[52] U.S. Cl. ...................... 318/286; 318/652; 318/468
[58] Field of Search ........................ 318/16, 565, 567, 318/626, 652, 671, 264, 265, 266, 283, 286, 466, 468, 480; 49/25, 31

[56] References Cited

U.S. PATENT DOCUMENTS

| | | |
|---|---|---|
| 3,852,592 | 12/1974 | Scoville et al. . |
| 4,530,183 | 7/1985 | Heise et al. ................................ 49/42 |
| 4,697,383 | 6/1987 | Hagiwara . |
| 4,823,010 | 4/1989 | Kornbrekke et al. . |
| 4,851,746 | 7/1989 | Milke . |
| 4,967,083 | 10/1990 | Kornbrekke et al. . |
| 5,001,557 | 3/1991 | Begle . |
| 5,134,292 | 7/1992 | Segawa et al. .................... 250/342 |

FOREIGN PATENT DOCUMENTS

| | | |
|---|---|---|
| 0344404 | 12/1989 | European Pat. Off. . |
| 3618692 | 12/1986 | Germany . |
| 2-208589 | 8/1990 | Japan . |
| 2-208584 | 8/1990 | Japan . |
| 2-236187 | 9/1990 | Japan . |

*Primary Examiner*—Bentsu Ro
*Attorney, Agent, or Firm*—Schnader Harrison Segal & Lewis

[57] ABSTRACT

An automatic door opening and closing system opens a door by driving means when a person approaches the door. A monitoring area is set in the vicinity of the door, and moving speed and direction computing means computes the speed and direction of movement of the person on the basis of changes in position of the person in the monitoring area. When it is judged from the computed direction of movement that the person is moving toward the door, door enabling area selecting means selects one of plural door enabling areas suitable for the speed of movement of the object. Open-door command means provides an open-door signal, which causes the door to be opened at a fixed speed, to the driving means so that the door is fully opened upon the predicted arrival of the person at the door.

10 Claims, 19 Drawing Sheets

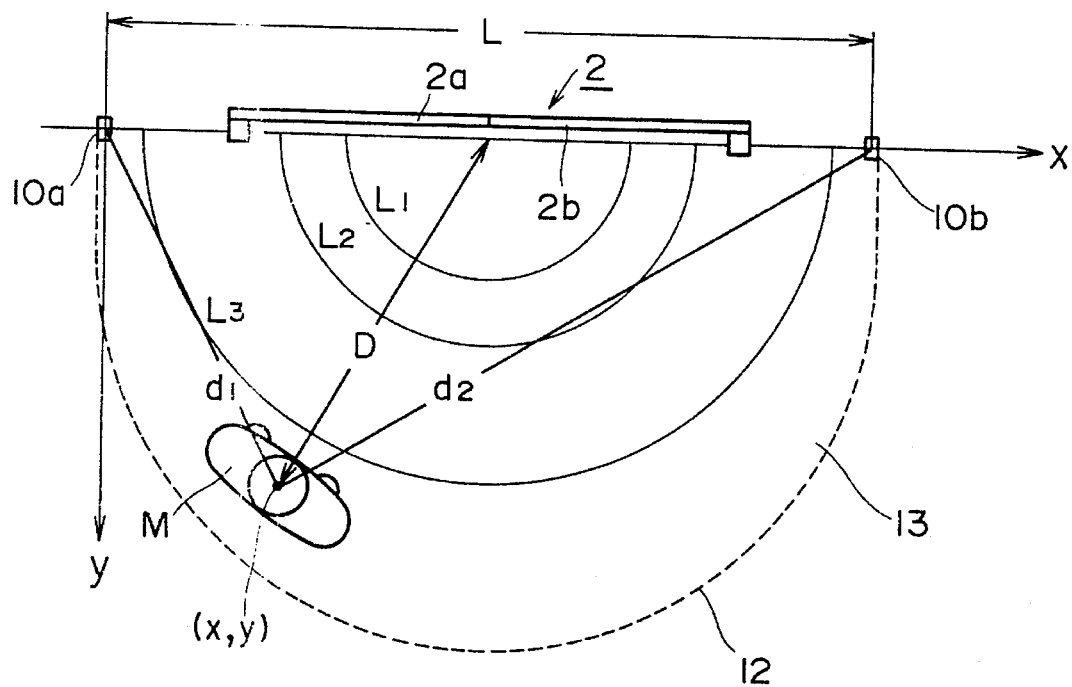
F I G. 1

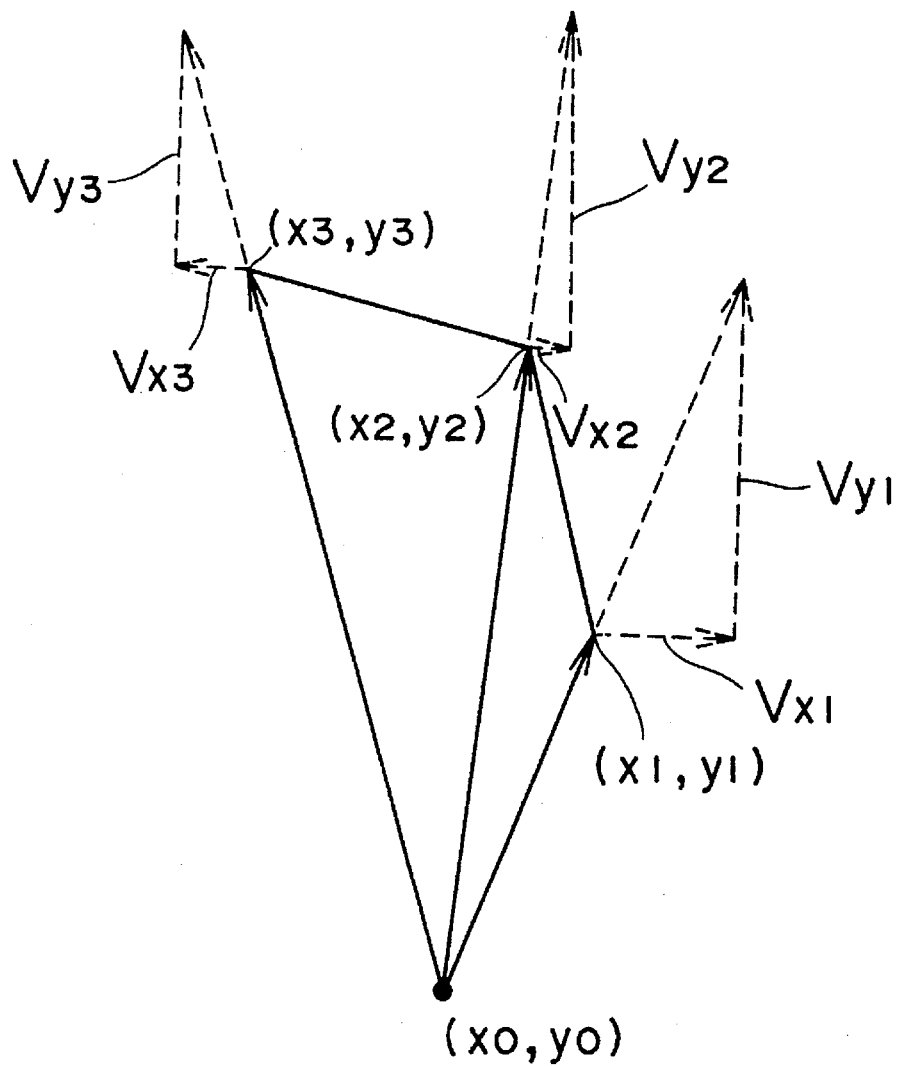
F I G . 4

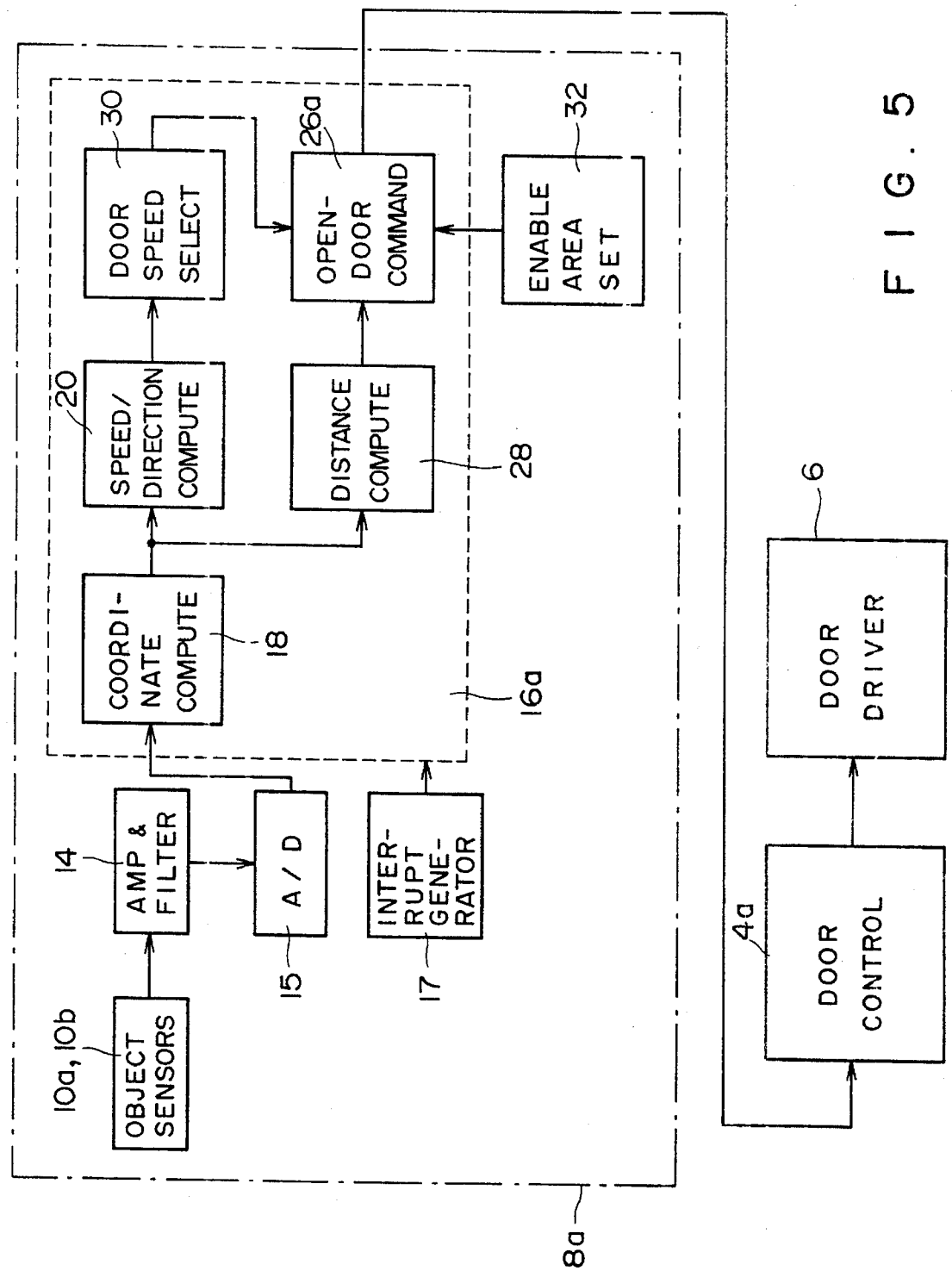
F I G. 5

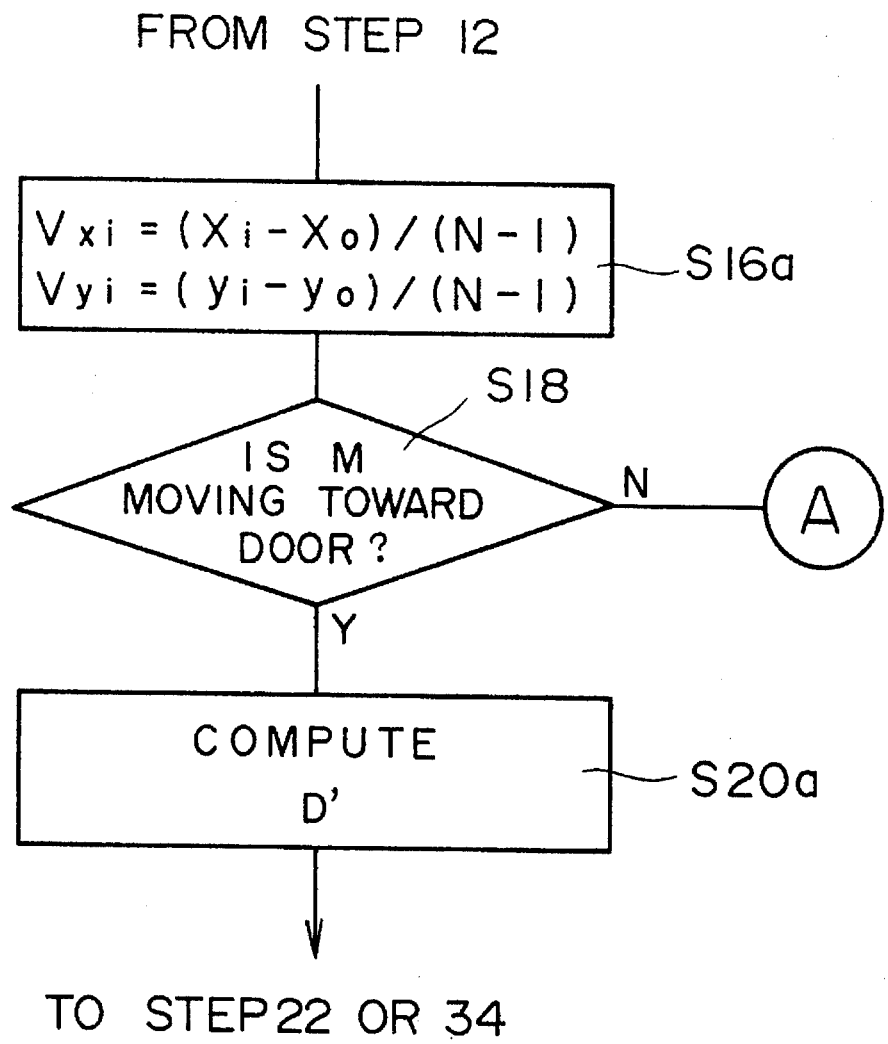
F I G . 9

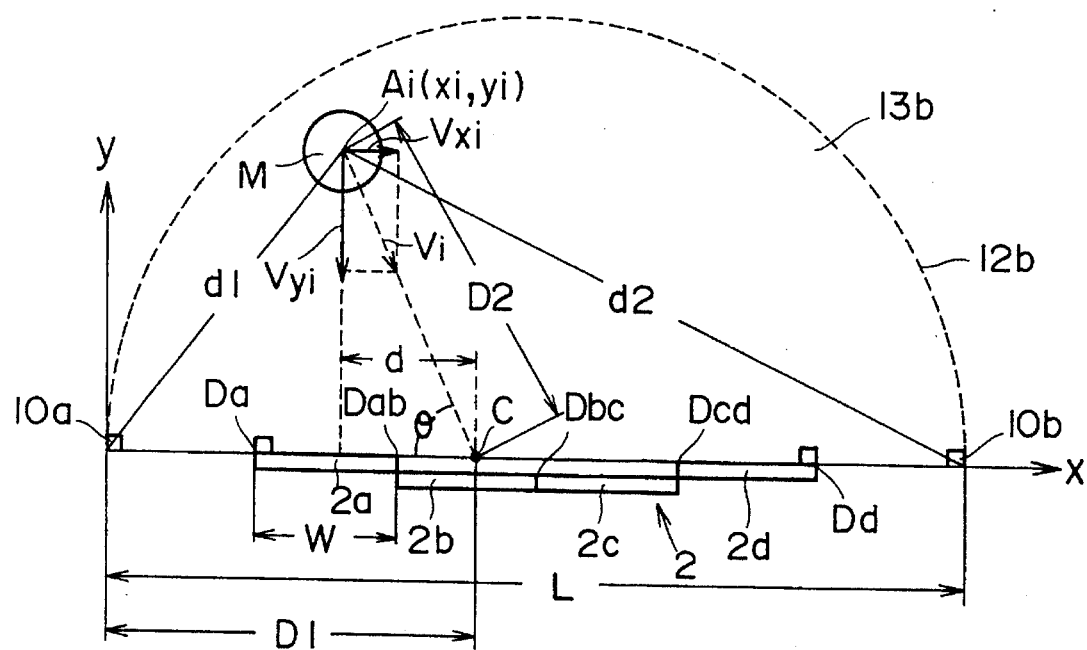
F I G. 12a
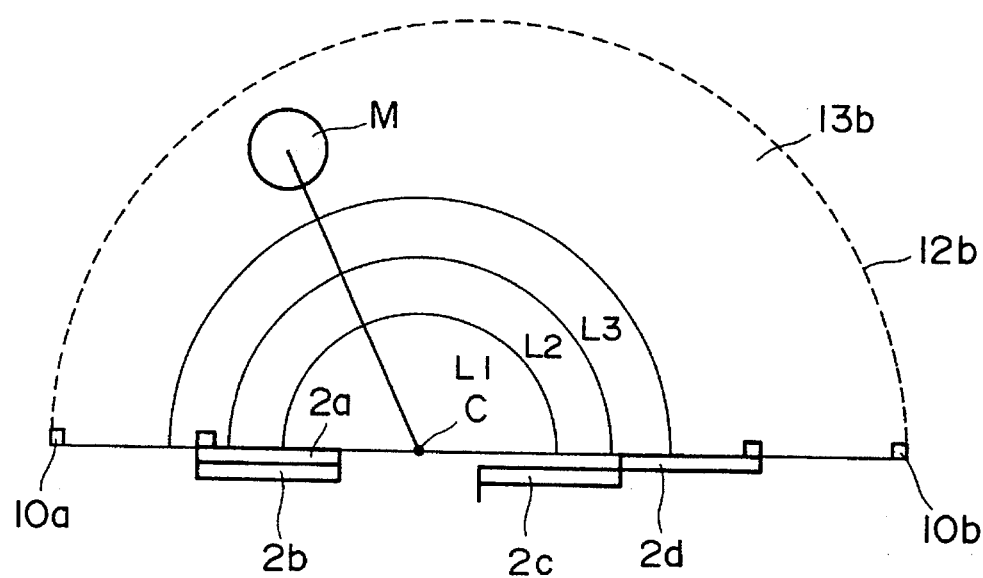
F I G. 12b

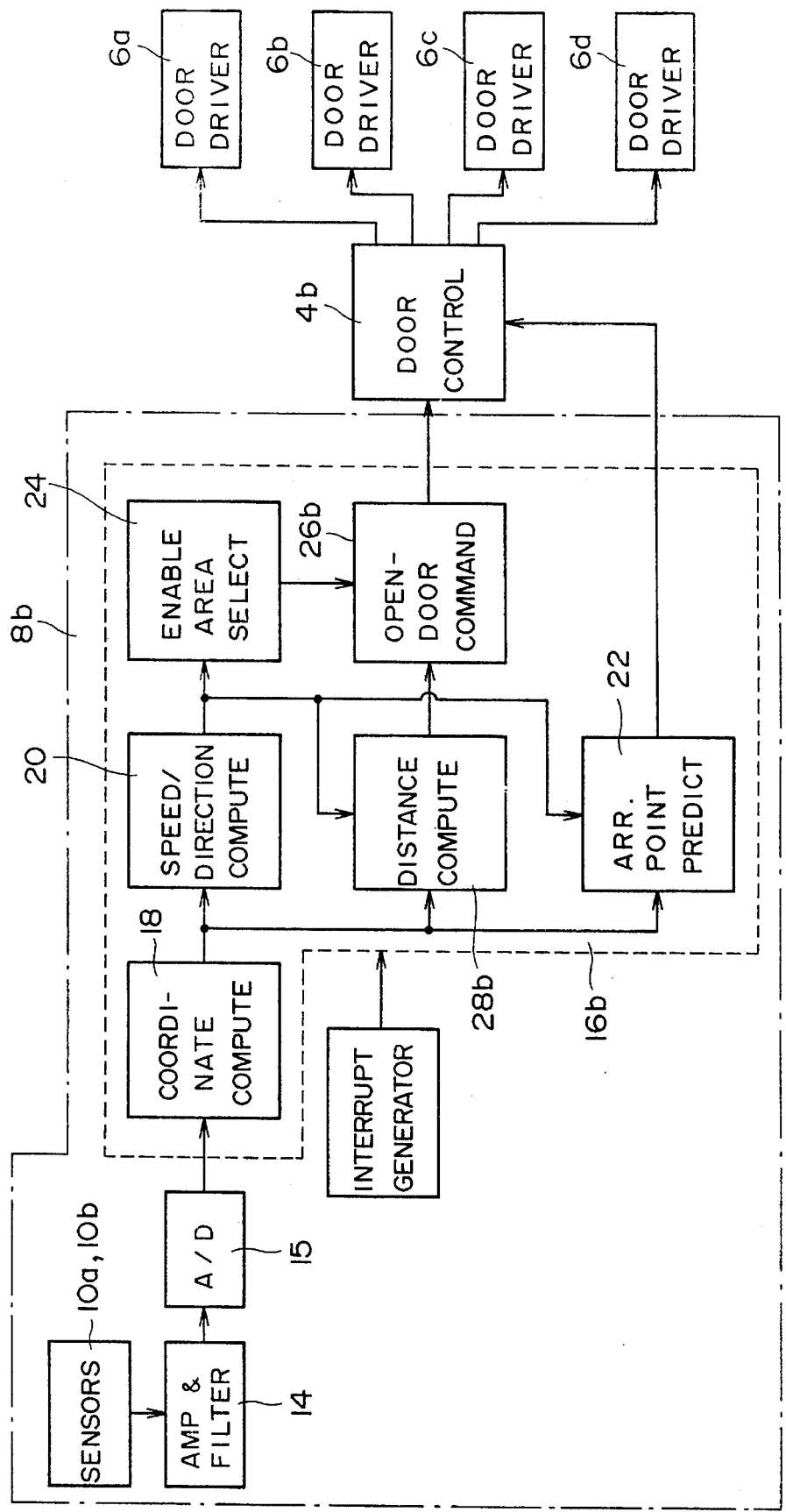
F I G. 13

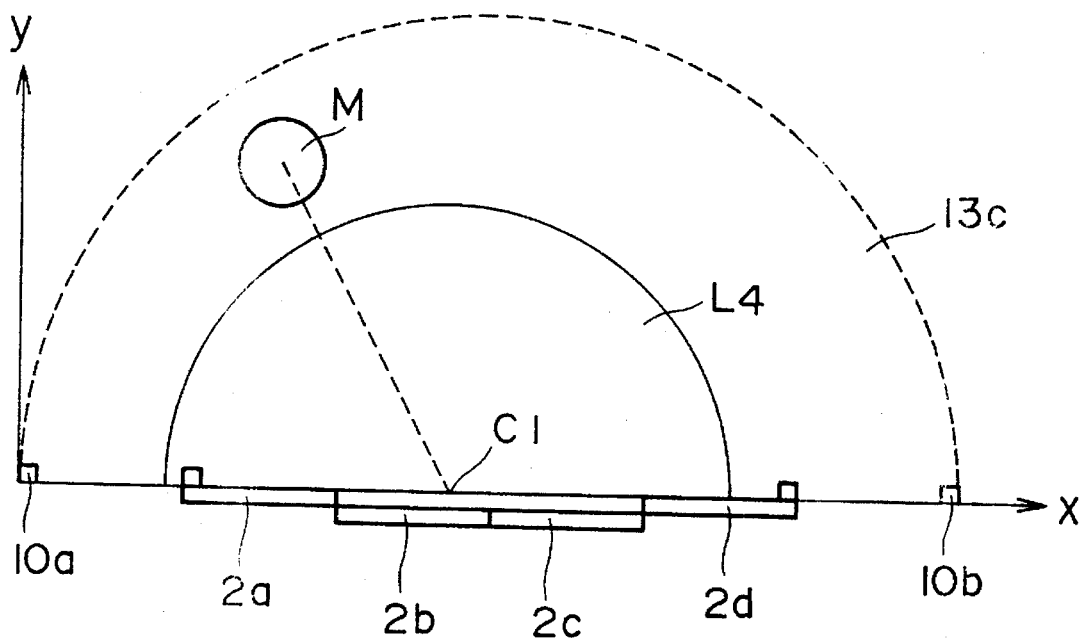
F I G. 16

AUTOMATIC DOOR OPENING AND CLOSING SYSTEM

The present invention relates to an automatic door opening and closing system which automatically opens a door when a human or anything that is to pass through the door approaches it.

BACKGROUND OF THE INVENTION

An example of prior art automatic door opening and closing systems is shown in Unexamined Japanese Patent Publication (KOKAI) No. HEI 2-208584. The system disclosed in this unexamined Japanese patent publication has one object detector including an ultrasonic Doppler sensor having a single sectorial door enabling area around it. When the detector senses an object, such as a human, approaching an automatic door, it generates a signal, which is used to arithmetically determine the distance of the object from the detector as well as its moving speed. When the calculated distance of the object becomes equal to the distance of the edge of the door enabling area from the detector, i.e. when the moving object reaches the edge of the door enabling area, the system accounts the object to be moving toward the automatic door. If the speed of the object when it is at the edge of the enabling area is high, the automatic door is opened when the object passes a predetermined point within the enabling area relatively remote from the door. If the object's speed determined at the edge of the enabling area is low, the automatic door is opened when the object reaches a point within the enabling area nearer to the door.

In this type of automatic door opening system, the location within the enabling area which is reached by the moving object to thereby cause the automatic door open is determined in accordance with the speed of the object at the edge of the enabling area. However, the speed of the object moving in the enabling area is not always the same as the speed of the object at the edge of the enabling area. If, for example, the object moving slowly at the edge of the enabling area moves faster after it enters the enabling area, it may occur that the door has not been opened, while the moving object has reached the front of the door. On the other hand, if the object moving fast at the edge of the enabling area slows down after it enters the enabling area, the door may be opened before the object has reached the door, so that it will take a longer time for the moving object to have passed through the door into a room after the door is opened. This means that the door is opened for a longer time, which can disadvantageously make air-conditioning of the room less effective.

There are various types of doors. One type includes a plurality of panels which are all opened or closed by a single driving system. One example of this type is a four-panel sliding door (or sometime called four sliding doors). When a moving object approaches any one of the four panels of the door, all of the four panels are pulled to open the door. However, it is not always necessary to open all of the panels, but it may sometimes be sufficient to open only one or more of the four panels enough to allow the moving object to pass. If all of the panels are unnecessarily opened, the air-conditioning efficiency of the room is disadvantageously lowered.

The object of the present invention is to eliminate the above-described defects of prior art automatic door opening and closing system.

According to the present invention, a monitoring area is provided outside a door enabling area, and the velocity of a moving object approaching a door is measured in the monitoring area. The measured velocity is used to predict the time when the object arrives at the door. The door is energized so that it is fully opened at the predicted arrival time of the object.

According to the present invention, a door enabling area is set inside the monitoring area. The enabling area is set in accordance with the velocity of the moving object within the monitoring area. When the object arrives at the enabling area, the energization of the automatic door is started so that the door is fully opened upon the arrival of the object at the door.

According to another embodiment of the invention, an automatic door includes a plurality of door panels. The panel which the moving object will arrive at is predicted on the basis of the direction of movement of the object, and only the predicted panel is driven to open.

According to another aspect of the invention, a monitoring area is set around the panels of the plural-panel automatic door, and the direction of movement of the object is determined within the monitoring area to predict which the panel the object will arrive at. A door enabling area is set in the vicinity of the predicted panel, and upon the arrival of the object at the outer edge of the enabling area, the panel is started to be driven so that it is fully opened upon the arrival of the object at the panel.

SUMMARY OF THE INVENTION

According to one embodiment of the present invention, an automatic door opening and closing system includes a door enabling area which is set in the vicinity of a door which is opened or closed by door driving means, and a monitoring area is set outside the door enabling area. When an object which is going to pass through the door enters into the monitoring area, information representing changes in position of the object in the monitoring area is applied to moving speed and direction computing means, which computes, in accordance with the applied position change information, the speed and direction of movement of the object moving within the monitoring area. In order for the door to be fully opened at the time when the object arrives at the door, an open-door signal supplying means supplies an open-door signal, which causes the door to be opened, to the driving means in accordance with the computed moving speed of the object computed by said computing means when the object reaches the door enabling area.

According to another aspect of the invention, an automatic door opening and closing system includes moving speed and direction computing means for computing the speed and direction of movement of an object moving within a monitoring area set around a door, based on information representative of changes in position of the object in the monitoring area. The system further includes signal output means which outputs a signal when the moving object is judged to be moving in the direction of the door on the basis of the direction of movement of the object as computed by the computing means. When the signal output means outputs the signal, open-door signal supplying means sets at least one door enabling area around the door and supplies a door enabling signal to door driving means in accordance with the speed of movement of the object as computed by the computing means when the object reaches the door enabling area so as to drive the door open at a predicted time of arrival of the object at the door.

The open-door signal supplying means may be arranged to set the door enabling area at a distance farther from the door as the moving object moves in the direction toward the door at a higher speed, and supplies the door enabling signal when the moving object arrives at the door enabling area.

A plurality of door enabling areas may be set around the door. Within the largest door enabling area, the next largest and successively smaller door enabling areas are set. A reference speed range is predetermined for each of the door enabling areas. Each time the speed of movement of the object within the monitoring area is computed by the moving speed and direction computing means, the computed moving speed of the object is compared with the respective reference speed ranges, and one of the door enabling areas is selected in accordance with the result of the comparison.

Alternatively, a single door enabling area may be set at a location spaced from the door, and the open-door signal supplying means sets a door opening speed faster as the speed of the object moving in the direction of the door is faster and supplies the open-door signal for enabling the door at the set faster door opening speed so that the door is fully opened upon the arrival of the object at the door.

The door opening speed may be set to a different one of a plurality of speeds, and a plurality of moving object reference speed ranges corresponding to the respective ones of a plurality of door opening speeds are set. Each time the speed of movement of the object within the monitoring area is computed, the open-door signal supplying means compares the computed speed of movement of the object with the respective reference speed ranges and selects one of the ranges in accordance with the result of the comparison.

The door enabling signal supplying means may include means for setting a door enabling area in accordance with the speed of movement of the object, and means for outputting an open-door signal for opening the door at a fixed speed. The system may further include means for enabling the moving speed and direction computing means, the signal output means, and the door enabling signal supplying means at predetermined time intervals.

A single door enabling area may be set, and the open-door signal supplying means may include means for selecting a speed at which the door is to be opened in accordance with the speed of movement of the object, and means for outputting an open-door signal to open the door at the selected speed when the moving object arrives at the door enabling area. The system may further include means for enabling the moving speed and direction computing means, the signal output means, and the door enabling signal supplying means at predetermined time intervals.

The automatic door may include a plurality of door panels each of which is driven by its own driving means to open and close. Predicting means may be provided for predicting the one of the panels at which the moving object will arrive, on the basis of the direction of movement of the object as computed by the moving speed and direction computing means. At least one door enabling area is set around the predicted panel, and the open-door signal supplying means supplies an open-door signal to the driving means for the predicted door panel when the moving object arrives at the door enabling area so that the panel can be fully opened at the time of arrival of the object at the predicted panel.

According to still another aspect of the invention, an automatic door opening and closing system includes moving speed and direction computing means for computing the direction and speed of movement of a moving object which is going to pass through the door, on the basis of information representative of changes in position of the object near a plurality of door panels which are driven by individual driving means. The system includes further predicting means for predicting the panel at which the object may arrive on the basis of the direction of movement of the object as computed by the computing means, and door enabling signal supplying means for supplying a door enabling signal to the driving means for the predicted panel.

Now, some embodiments of the present invention are described in detail with reference to the accompanying drawings.

BRIEF DESCRIPTION OF THE DRAWINGS

FIG. 1 is a plan view of an automatic door opening and closing system according to a first embodiment of the present invention;

FIG. 4 illustrates how the speed of a moving object is computed in the system shown in FIG. 1;

FIG. 5 is a block diagram of an automatic door opening and closing system according to a second embodiment of the present invention;

FIG. 9 is part of the flow chart of the operation of the system shown in FIG. 8, corresponding to the flow chart shown in FIGS. 3a and 3b which has been modified to accommodate the modification shown in FIG. 8;

FIG. 12a is a plan view of a door opening and closing system according to a third embodiment of the present invention;

FIG. 12b is a plan view corresponding to FIG. 12a, in which door enabling areas have been set;

FIG. 13 is a block diagram of the automatic door opening and closing system according to the third embodiment;

FIG. 16 is a plan view of the system according to the fourth embodiment;

FIG. 17b shows the door opening and closing system corresponding to the one shown in FIG. 17a, in which two moving objects are approaching different door panels which are different from the panels shown in FIG. 17a.

DETAILED DESCRIPTION OF PREFERRED EMBODIMENTS

Figure 2:
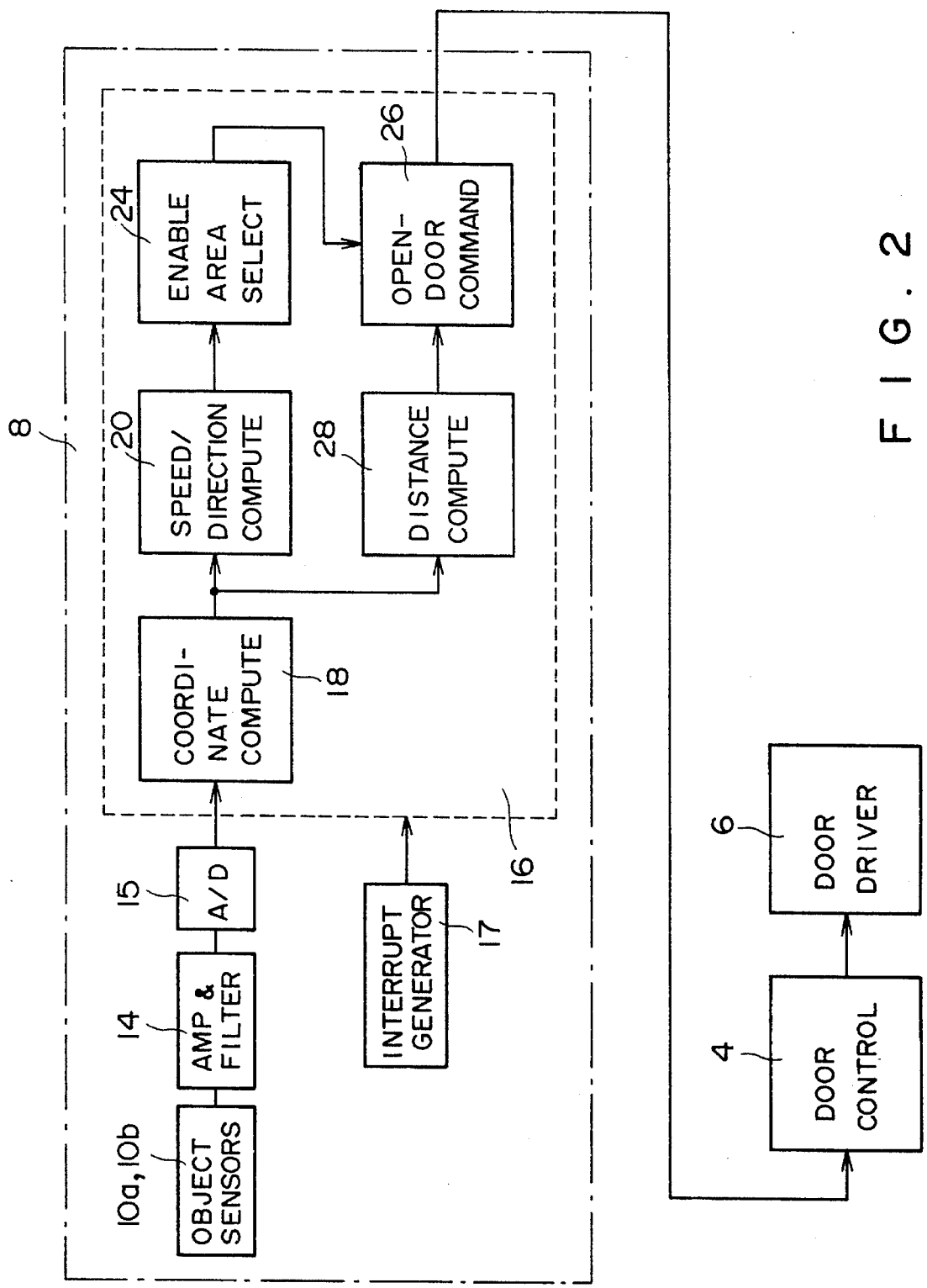
FIG. 2 is a block diagram of the automatic door opening and closing system shown in FIG. 1.

An automatic door opening and closing system according to a first embodiment of the present invention is shown in FIGS. 1 through 4. The automatic door opening and closing system opens a door, such as a double-panel sliding door 2 including two panels 2a and 2b shown in FIG. 1, when an object, such as a human, approaches the door. The panels 2a and 2b are opened and closed by a single door driving device 6 in response to a control signal supplied from a single door opening and closing control device 4 shown in FIG. 2. The door opening and closing control device 4 responds to an open-door command signal generated by a detecting device 8 when a time for opening the door 2 lapses, and provides a control signal to the door driving device 6 so as to drive the panels 2a and 2b open in opposite directions at a predetermined speed. The door opening and closing control device 4 is arranged to provide the door driving device 6 with a control signal to close the door when a predetermined time period lapses after it receives the open-door command signal.

The detecting device 8 includes object sensors 10a and 10b, such as ultrasonic sensors, disposed on opposite sides of the door 2, as shown in FIG. 1. The object sensors 10a and 10b can sense an object M moving in a semicircular monitoring area 13 defined by an outer edge 12 and the door 2, and produces detection signals representing the distances of the object M from the respective sensors 10a and 10b.

The detection signals from the sensors 10a and 10b are applied to an amplifier-filter unit 14 (FIG. 2) where they are amplified and undesirable noise components are filtered out. Outputs of the unit 14 are converted into digital signals in an analog-to-digital (A/D) converters 15 before they are applied to a microcomputer 16.

Figure 3A:
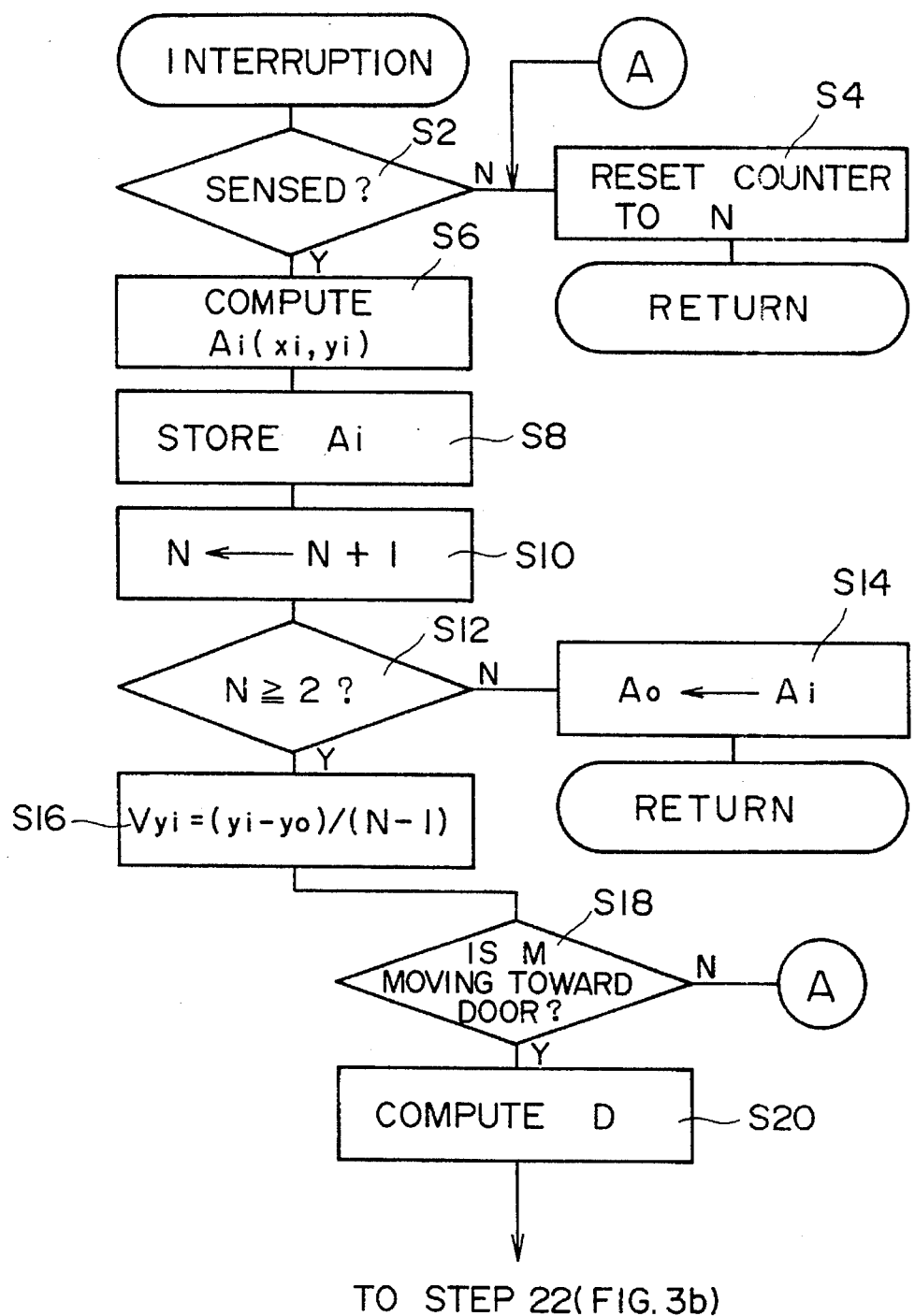
FIGS. 3a and 3b show a flow chart of the operation of the door opening and closing system shown in FIG. 1.
Figure 3B:
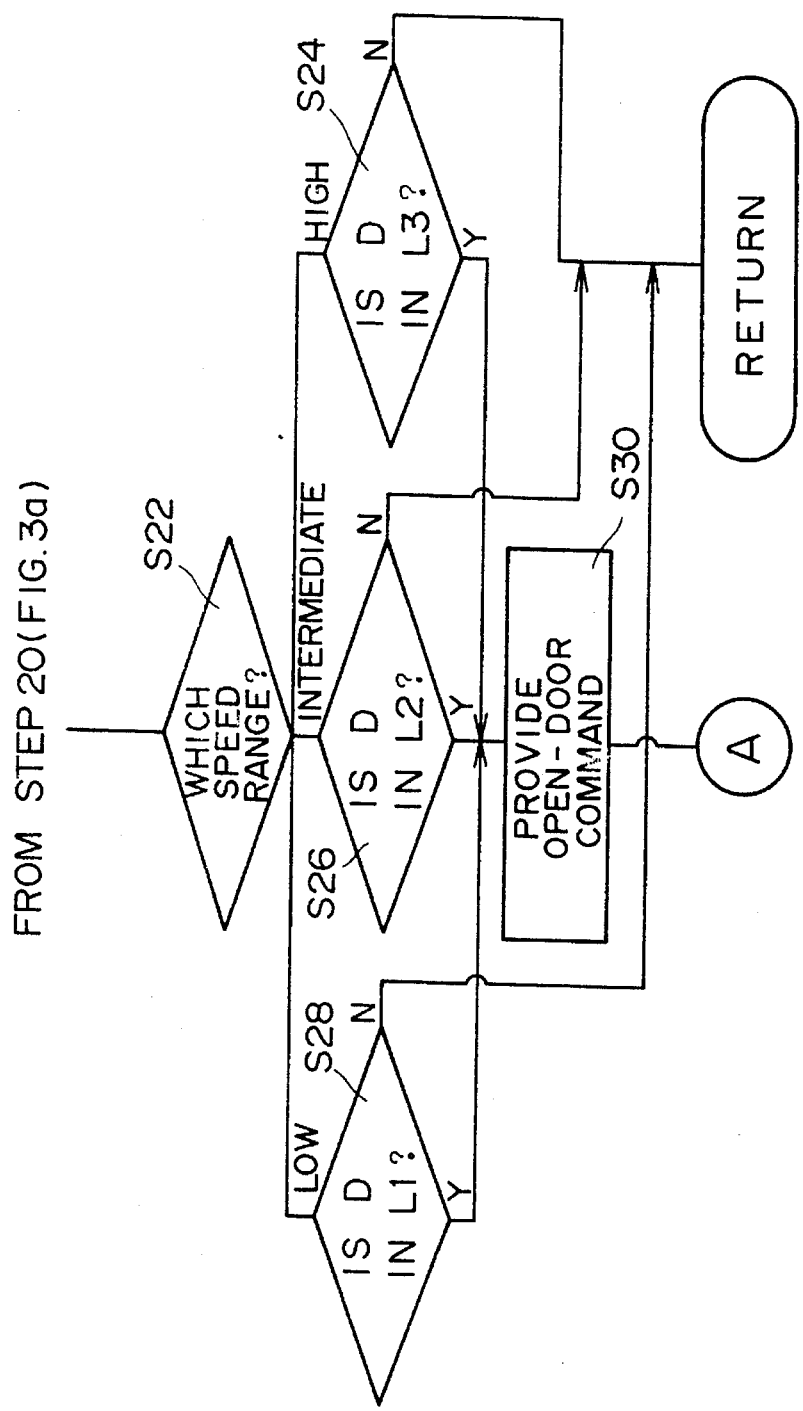

The microcomputer 16 performs operation according to a flow chart shown in FIGS. 3a and 3b to act as a coordinate computing unit 18, a moving speed and direction computing unit 20, a door enabling area selecting unit 24, an open-door command unit 26, and a distance computing unit 28 which are all shown in FIG. 2.

The coordinate computing unit 18 receives digital signals from the A/D converter 15 (i.e. amplified, filtered, and digitized versions of detection signals from the two object sensors 10a and 10b) at predetermined time intervals of, for example, 0.1 seconds. As described previously, these digital signals represent the distances of the moving object M from the respective sensors 10a and 10b. The coordinate computing unit computes the coordinates of the position of the moving object M in a coordinate system having a predetermined origin, on the basis of the distances represented by the digital signals, and provides coordinate signals representing the computed coordinates to the moving speed and direction computing unit 20.

Let it be assumed that, as shown in FIG. 1, the moving object sensors 10a and 10b are spaced by a distance L from each other, and that the object M is at a distance d1 from the detector 10a and at a distance d2 from the detector 10b within a coordinate system with its origin located at the detector 10a, with the x-axis extending along the line connecting the sensors 10 and 10b, and with the y-axis extending perpendicular to the x-axis from the origin in the direction away from the door. Then, the coordinates (x,y) of the moving object M are derived by the following formulas (1) and (2).

$$x=(d1^2-d2^2+L^2)/2L \qquad (1)$$

$$y=(d1^2-x^2)^{1/2} \qquad (2)$$

Coordinate signals representing the coordinates of the moving object M are applied to the moving speed and direction computing unit 20 where the speed and direction of movement of the object M are computed. The computation of the speed may be carried out in the following manner, for example. Referring to FIG. 4, the coordinates of the object M at a time $t_0$ when its enters the monitoring area 13 is expressed as $(x_0, y_0)$, and the coordinates of the object M at a time $t_1$, that is 0.1 second after $t_0$ are expressed as $(x_1, y_1)$. Then, the average moving speed $V_{x^1}$ of the object M at $t_1$ along the x-axis over the period of 0.1 second is calculated from $(x_1-x_0)$, and the average moving speed $V_{y^1}$ along the y-axis over the same period of 0.1 second can be calculated from $(y_1-y_0)$. At a time $t_2$, which is 0.2 seconds after the time $t_0$, when the object has moved to a position of which the coordinates are $(x_2, y_2)$, the average moving speed $V_{x^2}$ at $t_2$ along the x-axis over a period of 0.1 second can be calculated from $(x_2-x_0)/2$, and the average moving speed $V_{y^2}$ over the same period of 0.1 second along the y-axis can be calculated from $(y_2-y_0)/2$. Similarly, when the object has moved to a position expressed by coordinates $(x_3, y_3)$ at a time $t_3$, which is 0.3 seconds after $t_0$, the average moving speed $V_{x^3}$ over a period of 0.1 second along the x-axis can be calculated from $(x_3-x_0)/3$, while the average speed along the y-axis can be calculated from $(y_3-y_0)/3$.

As described, the average moving speeds of the moving object M along the x-axis and the y-axis over a 0.1 second period at a current position of which the coordinates are expressed as $A_i$, and applied to the moving speed and direction computing unit 20, can be calculated by the differences in distance along the x-axis and the y-axis between the current coordinate position and the reference coordinate position $A_0$ $(x_0, y_0)$, i.e. the position at which the moving object has entered the monitoring area, divided by a value N−1, where N is a count N provided from, for example, a counter (not shown) which counts the number N of the positions the moving object has moved to every 0.1 second. In other words, the average moving speed $V_{x^i}$ along the x-axis at the i-th coordinate position entered into the unit 20 is calculated from the following formula (3), and the average moving speed $V_{y^i}$ along the y-axis is calculated from the following formula (4).

$$V_{x^i}=(x_i-x_0)/(N-1) \qquad (3)$$

$$V_{y^i}=(y_i-y_0)/(N-1) \qquad (4)$$

The direction of movement of the moving object M may be determined, for example, in the following manner. For example, when the average moving speed along the y-axis as calculated from the formula (4) is positive, the object M is moving away from the door 2, and, if it is negative, the object M is moving in the direction of the door 2. Like this, the direction of movement can be determined by the sign of the average moving speed of the object M as calculated by the formula (4). In other words, if the current position coordinate of the object M along the y-axis is smaller than that of the previous position, the object may be determined as moving in the direction of the x-axis or to the door 2. The determination of the direction of movement of the object M is also performed in the moving speed and direction computing unit 20.

When the moving speed and direction computing unit 20 determines that the moving object M is approaching the door 2, it applies a signal indicating it to the door enabling area selecting unit 24. Then, the door enabling area selecting unit 24 selects one of door enabling areas within the monitoring area 13 in accordance with the magnitude of the average moving speed along the y-axis of the object M as applied from the moving speed and direction computing unit 20. The three door enabling areas include a smallest area L1, an intermediate area L2, and a largest area L3, in the example shown in FIG. 1. Practically, since only the average moving speed $V_{yi}$ along the y-axis is used, the average moving speed computed in the moving speed and direction computing unit 20 is only the average moving speed $V_{yi}$.

The smallest door enabling area L1 is a semi-circular area which is centered about the center of the door 2 and has a radius of, for example, 0.8 m. The intermediate-sized door enabling area L2 is also a semi-circular area having a radius of, for example, 1.2 m and is concentric with the area L1. The largest door enabling area L3 is a semi-circular area having a radius of, for example, 2 m and is concentric with the area L1.

In the illustrated embodiment, the average moving speed of the object M is sorted into one of three reference speed ranges, namely, a high speed range, an intermediate speed range, and a low speed range.

When the average moving speed along the y-axis of the object M is in the low speed range of, for example, less than 0.8 m/second, the smallest door enabling area L1 is selected. If the average moving speed along the y-axis is in the intermediate speed range of, for example, from 0.8 to 1.2 m/second, the intermediate-sized door enabling area L2 is selected. If the object moves along the y-axis at an average moving speed of higher than 1.2 m/second, the largest door enabling area L3 is selected. Like this, the door enabling area selecting unit 24 selects one of the areas L1, L2, and L3.

The selection of the door enabling area is done each time the coordinates of the object M within the monitoring area 13 are computed in the coordinate computing unit 18. Accordingly, if, for example, the object M is moving initially at a low average moving speed along the y-axis and the smallest door enabling area L1 is selected, the intermediate-sized door enabling area L2 may be selected anew if the average moving speed of the object M becomes higher later in the monitoring area 13 and thus determined to be in the intermediate speed range. According to the present invention, the door enabling area is not determined in accordance with the speed of the object M at a given fixed point, for example, at the outer edge 12 of the monitoring area 13, but it is selected anew each time the average moving speed of the object M, which may vary from time to time, is computed.

When one of the door enabling areas is selected, the open-door command unit 26 determines if the object M is within the selected area. For that purpose, the distance computing unit 28 uses coordinate representative signals from the coordinate computing unit 18 to compute the distance D of the object M from the center of the door 2. The coordinates of the position of the center of the door 2 are known to be, for example, (L/2, 0), and the coordinates of the current position of the object M, for example, (x, y) are provided by the coordinate representative signals. Thus, the distance D is calculated from the following formula (5).

$$D = [(L/2 - x)^2 + y^2]^{1/2} \quad (5)$$

For instance, with the largest door enabling area L3 selected, the open-door command unit 26 determines whether or not the distance D as calculated by the distance computing unit 28 is a value failing into the largest door enabling area L3, that is, 2 m or less. If the object M is within the largest area L3, the open-door command unit 26 supplies an open-door command signal to the door opening and closing control device 4.

When the intermediate-sized door enabling area L2 has been selected, the unit 26 determines whether or not the distance D as computed in the distance computing unit 28 falls within the area L2, i.e. whether the distance D is 1.2 m or less. If the object M is within the area L2, an open-door command signal is applied to the door control device 4 from the open-door command unit 26.

If the smallest door enabling area L1 is selected, and the distance D is 0.8 m or less, the open-door command unit 26 supplies an open-door command signal to the door opening and closing control device 4.

Thus, regardless of which the average moving speed along the y-axis of the moving object M is in the low, intermediate, or high speed range, when the object M arrives at the position determined for that average moving speed the door 2 starts opening at a fixed speed. Specifically, if the object M is moving at a speed in the high speed range, the door 2 starts opening at the fixed speed when the object M enters the largest door enabling area L3 or, in other words, when the object is at a relatively remote point from the door 2. If the object M is moving at a speed in the intermediate speed range, the door 2 starts opening when the object M reaches the area L2. Similarly, the door 2 starts opening at the fixed speed when the object M moving at a speed in the low speed range reaches the smallest door enabling area L1.

The fixed speed at which the door 2 is opened is determined such that the door 2 is completely opened in the time required for the object M to arrive at the door 2 at a low speed from the smallest door enabling area L1, at an intermediate speed from the intermediate-sized door enabling area L2, or at a high speed from the largest door enabling area L3.

Thus, regardless of which one of the door enabling area the moving object M arrives from at the door 2, the door 2 has been opened for the object M to pass through it just when the object M arrives at the door 2. It never happens that the door is wide open before the object M arrives at the door 2 or the opening of the door has not been completed by the time when the object M is in front of the door 2. This enables the object M to pass the door 2 smoothly. In addition, the air-conditioning effect is not degraded.

How the micro-computer 16 operates as the coordinate computing unit 18, the moving speed and direction computing unit 20, the door enabling area selecting unit 24, the open-door command unit 26, and the distance computing unit 28, is now described with reference to the flow chart shown in FIGS. 3a and 3b. The routine represented by the flow chart of FIGS. 3a and 3b is an interruption routine and is executed in response to an interruption signal generated by an interruption signal generating unit 17 (FIG. 2) at predetermined time intervals, for, example, at intervals of 0.1 second. It should be noted, however, that if an open-door command signal has been already supplied to the door opening and closing control device 4, the interruption routine is not executed.

In the interruption routine, first whether object sensors 10a and 10b sense the moving object M in the monitoring area 13 (STEP 2). If no object M is sensed, i.e. if judgment in STEP 2 is NO, a software counter N used for computing the average moving speed of the object M, is reset (STEP 4), and the processing returns to a main routine.

If the object M is sensed in the monitoring area 13, i.e. if the judgment made in STEP 2 is YES, the coordinates A, ($x_i$, $y_i$) of the object M are determined by the formulas (1) and (2), using the digital signals provided from the A/D converter 15 (STEP 6). This STEP 6 is executed in the coordinate computing unit 18.

Following STEP 6, the computed coordinate position As is stored (STEP 8), and the counter N is incremented by 1 (STEP 10) whereby the number of the coordinate positions which were detected is stored in the form of the ordinal number. Then, in STEP 12, whether N is 2 or greater is determined. If N is not 2 or greater, i.e. if the determination in STEP 12 is NO, it means that the stored position $A_i$ is the first detected position of the object M detected in the monitoring area 13. Thus, in order to use this position $A_i$ as the reference for determining the average moving speed of the object M, it is stored as the reference coordinate position $A_o$ ($x_0$, $y_0$) in STEP 14. Thereafter, the program returns to the main routine.

If the count N is 2 or larger, i.e. if the judgment made in STEP 12 is YES, it means that the coordinate position $A_i$ stored in STEP 8 is not the reference position, and, therefore, the average moving speed along the y-axis is computed in accordance with the formula (4) (STEP 16).

Next, whether the object M is moving in the direction of the door 2 or not is determined (STEP 18). This determination can be done by, for example, determining if the average moving speed along the y-axis of the object as computed in STEP 16 has a negative value. If the object M is not moving toward the door 2 (i.e. if the answer in STEP 18 is NO), the processing proceeds to STEP 4 to reset the Counter N and returns to the main routine.

STEPS 8, 10, 12, 14, 16, and 18 correspond to the moving speed and direction computing unit 20, and, in particular, STEP 18 corresponds to "output means" referred to in the accompanying claims.

If the object M is moving toward the door 2 (i.e. if the answer in STEP 18 is YES), the distance D of the object M from the center of the door 2 is computed in accordance with the formula (5) (STEP 20). STEP 20 corresponds to the distance computing unit 28.

After STEP 20, it is determined in which one of the speed ranges, namely, the high speed range, the intermediate speed range, and the low speed range, the average moving speed along the y-axis as determined in STEP 16 is (STEP 22) (FIG. 3b).

If the average moving speed is determined to be in the high speed range in STEP 22, STEP 24 determines if the distance D as computed in STEP 20 is in the largest door enabling area L3. If STEP 22 finds that the average moving speed is in the intermediate speed range, STEP 26 determines if the distance D as computed in STEP 20 is in the intermediate-sized door enabling area L2. If the average moving speed is found to be in the lowest speed range, whether or not the distance D as computed in STEP 20 is in the smallest door enabling area L1 is judged (STEP 28).

Like this, depending on which speed range the average moving speed is in, the highest, intermediate, or lowest speed range, which is determined in STEP 22, the door enabling area with which the distance D is compared is selected. Thus, STEP 22 corresponds to the door enabling area selecting unit 24 in FIG. 2.

If the distance D is found to be in the largest door enabling area L3 in STEP 24, i.e. if the answer in STEP 24 is YES, which means that the moving object M is in the area L3, an open-door command signal is applied to the door opening and closing control device 4 (STEP 30), and the processing proceeds to STEP 4 which resets the counter N. Then, the processing returns to the main routine.

If it is determined in STEP 24 that the distance D is not a value in the largest area L3, i.e. if the answer in STEP 24 is NO, the processing is returned to the main routine.

If it is determined in STEP 26 that the distance D is a value in the intermediate-sized door enabling area L2, i.e. if the answer in STEP 26 is YES, which means that the moving object M is in the area L2, STEP 30 is executed to apply an open-door command signal to the door opening and closing control device 4, and the processing proceeds to STEP 4 which resets the counter N. Then, the processing returns to the main routine.

If it is determined in STEP 26 that the distance D is not a value in the intermediate-sized area L2, i.e. if the answer in STEP 26 is NO, the processing is returned to the main routine.

Similarly, if it is determined in STEP 28 that the distance D is a value in the smallest door enabling area L1, i.e. if the answer in STEP 28 is YES, which means that the moving object M is in the area L1, STEP 30 is executed to apply an open-door command signal to the door opening and closing control device 4, and the processing proceeds to STEP 4 which resets the counter N. Then, the processing returns to the main routine.

On the other hand, if it is determined in STEP 28 that the distance D is not a value in the largest area L1, i.e. if the answer in STEP 28 is NO, the processing is returned to the main routine.

As described above, if it is determined that the object M is not in the area L1, L2, or L3, the processing returns to the main routine, and the illustrated interruption routine is re-executed from STEP 2 0.1 seconds after, to determine the average moving speed along the y-axis of the moving object M on the basis of its current position. If the object M is determined as moving toward the door 2, one of the door enabling areas L1, L2, and L3 is set anew depending on the average moving speed, and, then, whether the object H is in that area or not is determined.

In other words, it is not that a fixed door enabling area is used at any time, but a suitable door enabling area is adaptively selected depending on the average moving speed computed each time the routine is executed. Thus, if the average moving speed of the object M is initially low, but if the object M increases its speed later so that the average moving speed becomes higher, the door enabling area may be changed from, for example, the smallest area L1 to the intermediate-sized area L2. Conversely, if the average moving speed has decreased from the initial one, the door enabling area may be changed from, for example, L2 to L1.

STEPS 24, 26, 28, and 30 determines whether the moving object M is in the selected door enabling area or not, and supplies an open-door command signal to the door opening and closing control device 4 if the object M is in the selected area. Thus, these steps, namely, STEPS 24, 26, 28, and 30 constitute the open-door command unit 26. STEPS 20–30 provide open-door signal output means.

Figure 6:
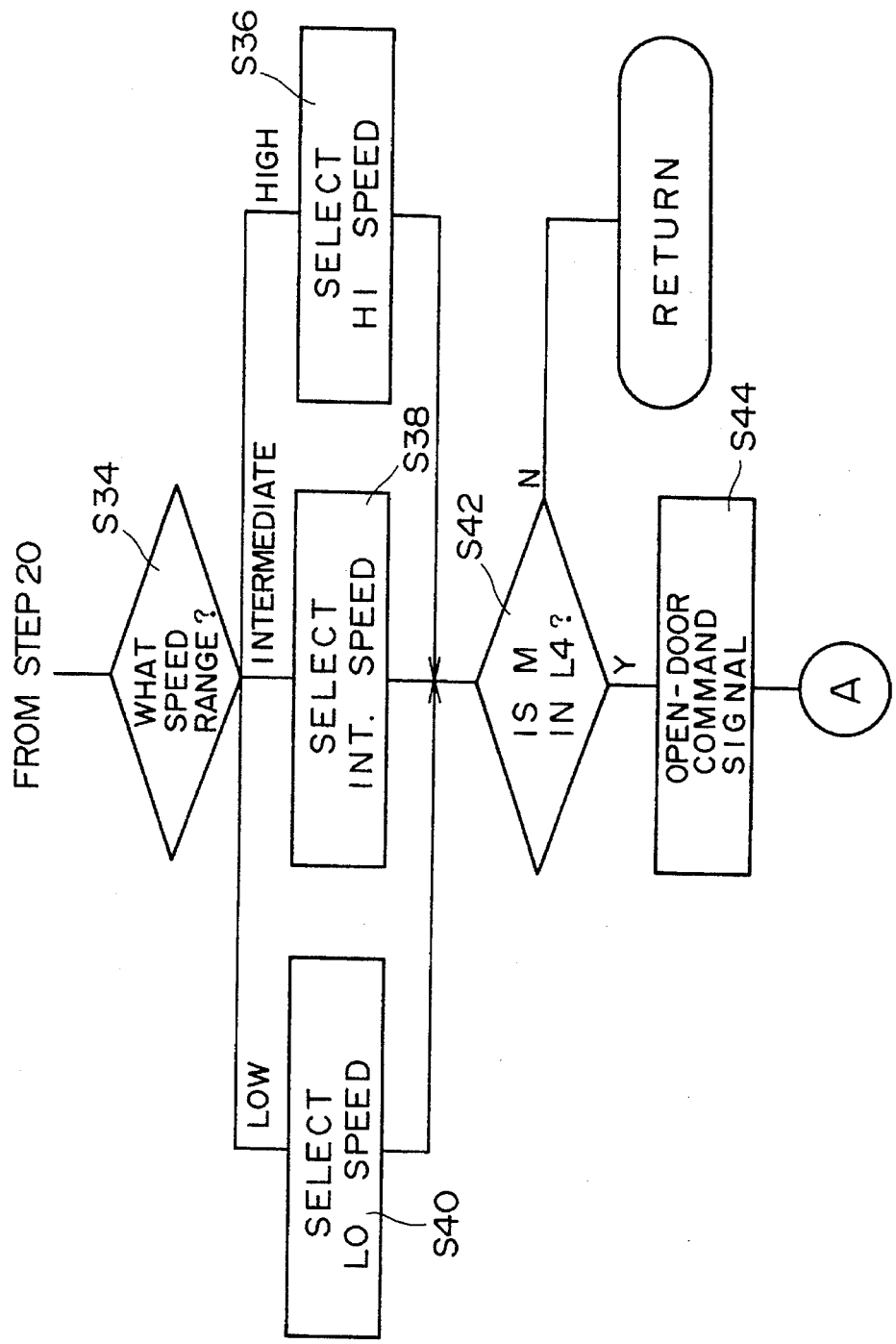
FIG. 6 is a flow chart illustrating a part of the operation of the door opening and closing system according to the second embodiment.
Figure 7:
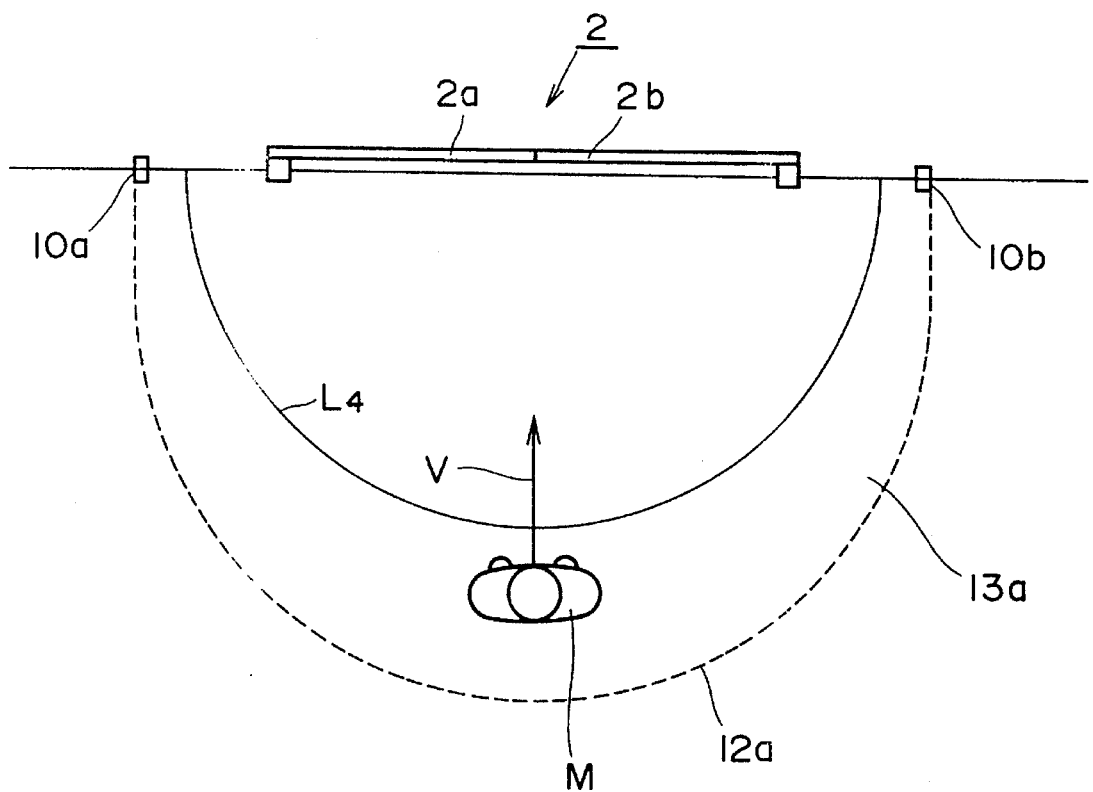
FIG. 7 is a plan view of the door opening and closing system according to the second embodiment.

FIGS. 5, 6, and 7 show an automatic door opening and closing system according to a second embodiment of the present invention. As shown in FIG. 7, according to the second embodiment, a fixed door enabling area L4 is set within a monitoring area 13a. The average moving speed of a moving object M over a time period from the time the object M entered the monitoring area 13a to the time it entered the door enabling area L4 is computed. When the object M reaches the door enabling area L4, the speed at which the door 2 is to be opened is determined depending on the computed average moving speed so as to complete the opening of the door 2 just when the object M arrives at the door 2.

As shown in FIG. 5, the system according to the second embodiment also includes a door opening and closing control device 4a and a door driving device 6. The door opening and closing control device 4a, however, differs from the device 4 in that it controls the door driving device 6 such that the door 2 is opened at a high speed when a high-speed open-door command signal is applied thereto from an open-door command unit 26a of a detecting device 8a, that the door 2 is opened at an intermediate speed when an intermediate-speed open-door command signal is applied thereto from the open-door command unit 26a of the detecting device 8a, and that the door 2 is opened at a low speed when a low-speed open-door command signal is applied thereto from the open-door command unit 26a of the detecting device 8a.

The open-door command signal is applied when the moving object M enters the door enabling area L4.

Similar to the detecting device 8 of the first embodiment, the detecting device 8a which provides the respective open-door command signals, includes object sensors 10a and 10b, an amplifier-filter unit 14, an A/D converter 15, a microcomputer 16a, and an interruption signal generating unit 17. The microcomputer 16a includes a coordinate computing unit 18, a moving speed and direction computing unit 20, and a distance computing unit 28, as in the first embodiment. As in the first embodiment, the speed and direction of movement of the moving object M and its distance D from the center of the door 2 are computed every 0.1 second, for example. According to the second embodiment, a door-opening speed selecting unit 30 is used in place of the door enabling area selecting unit 24 of the system of FIG. 2.

The door opening speed selecting unit 30 operates to select one of high, intermediate, and low door opening speeds depending on the average moving speed along the y-axis of the object M as computed in the moving speed and direction computing unit 20, when the movement of the object M toward the door 2 is determined by the moving speed and direction computing unit 20.

The open-door command unit 26a determines whether or not the moving object M has entered the door enabling area L4 set by a door enabling area setting unit 32, on the basis of the value of the distance D as supplied from the distance computing unit 28. If the object M has arrived at the area L4, an open-door command signal corresponding to one of the high speed, intermediate speed, and low speed which is the opening speed of the door 2 as determined in the door opening speed selecting unit 30 is applied from the unit 26a to the door opening and closing control device 4a.

As described above, according to the second embodiment, the door opening speed is determined on the basis of the average moving speed along the y-axis of the object M measured every 0.1. second. Accordingly, if the object M is moving at a low average moving speed along the y-axis when it has just entered the monitoring area 13a and, therefore, the low door opening speed has been selected, the intermediate door opening speed could be selected afterward if object M enters the door enabling area L4 at an increased average moving speed along the y-axis.

If the door opening speed was determined at the time when the object M has reached the outer edge 12a of the monitoring area 13a, it could happen that the door 2 is not open even when the object M has arrived at the door 2 or that the door 2 has been wide-open long before the object M arrives at the door 2, if the speed of movement of the object M changes in the monitoring area 13a as described above. However, according to the second embodiment, such situation can be avoided so that the door 2 is fully opened just at the time when the object M arrives at the door 2.

The processing for making the microcomputer 16a function as the coordinate computing unit 18, the moving speed and direction computing unit 20, and the distance computing unit 28 is executed each time the interruption signal generating unit 17 generates an interruption signal. When the interruption signal is generated, similar processing as done in STEPS 2 through 20 in the portion of the routine shown in FIG. 3 is executed. Accordingly, STEPS 2 through 20 are not described any more, but processing for making the microcomputer 16a function as the door opening speed selecting unit 30 and the open-door command unit 26a is described.

First, determination is made as to which one of a plurality of speed ranges the average moving speed along the y-axis of the object M is in, for example, a high speed range, an intermediate speed range, or a low speed range (STEP 34). For example, the high speed range may cover speeds of 1.2 m/second or higher, the intermediate speed range may cover speeds of from 0.8 m/second or higher but less than 1.2 m/second, and the low speed range may cover speeds of less than 0.8 m/second.

If the average moving speed is determined to be in the high speed range, a high speed for opening the door 2 is selected (STEP 36). Similarly, if the average moving speed is in the intermediate or low speed range, an intermediate speed or a low speed is selected for opening the door 2 in STEP 38 or STEP 40. Thus, STEP 34 through STEP 40 correspond to the door opening speed selecting unit 30.

Following one of STEPS 36, 38, and 40, whether the object M is within the door enabling area L4 or not is determined based on the distance of the object M from the center of the door 2 as computed in STEP 20 (STEP 42). If it is determined that the object M is not in the door enabling area L4, i.e. if the answer in STEP 42 is NO, the processing returns to the main routine, and 0.1 second after, the processing for determining the average moving speed along the y-axis of the object M etc. is resumed. Based on the determined average moving speed, the door opening speed is selected in STEP 34 through STEP 40.

When it is determined that the object M is within the door enabling area L4, i.e. the answer to STEP 42 is YES, an open-door command signal is applied to the door opening and closing control unit 4a (STEP 44) so that the door 2 may be opened at a speed which has been already determined in accordance with the average moving speed along the y-axis of the object M moving over a distance between the outer edge 12a of the monitoring area 13 and the door enabling area L4. After STEP 44, the processing returns to STEP 4 shown in FIG. 3 to reset the counter N and then returns to the main routine. Thus, STEPS 42 and 44 provides the open-door command unit 26a.

The speed at which the door 2 is opened is determined such that the door can be completely opened in the time necessary for the object M to move at one of the high, intermediate, and low speeds, from the outer edge of the door enabling area L4 to the door 2.

According to the first and second embodiments described above, the door enabling areas L1, L2, and L3, and L4 are set about the center of the door 2, assuming that the moving object M is moving toward the center of the door 2. However, moving object M, such a human being, may approach the door 2 at a point on one side of the center of the door 2 as shown in FIG. 8.

In order to deal with such situations, the first embodiment may be modified by substituting STEPS 16a and 20a shown in FIG. 9 for STEP 16 (FIG. 3a) for computing the average moving speed of the object M and STEP 20 for computing the distance D, respectively.

In STEP 16a, in addition to the average moving speed $V_{yi}$ along the y-axis, the average moving speed $V_{xi}$ along the x-axis is also computed. In STEP 20a, on the basis of the average moving speeds $V_{yi}$ and $V_{xi}$ along the y-axis and the x-axis as computed in STEP 16a, and the current coordinates (x, y) of the moving object M, the point on the door 2 at which the object M will arrive is predicted and the distance D' of the object M from the predicted point is computed.

Figure 8:
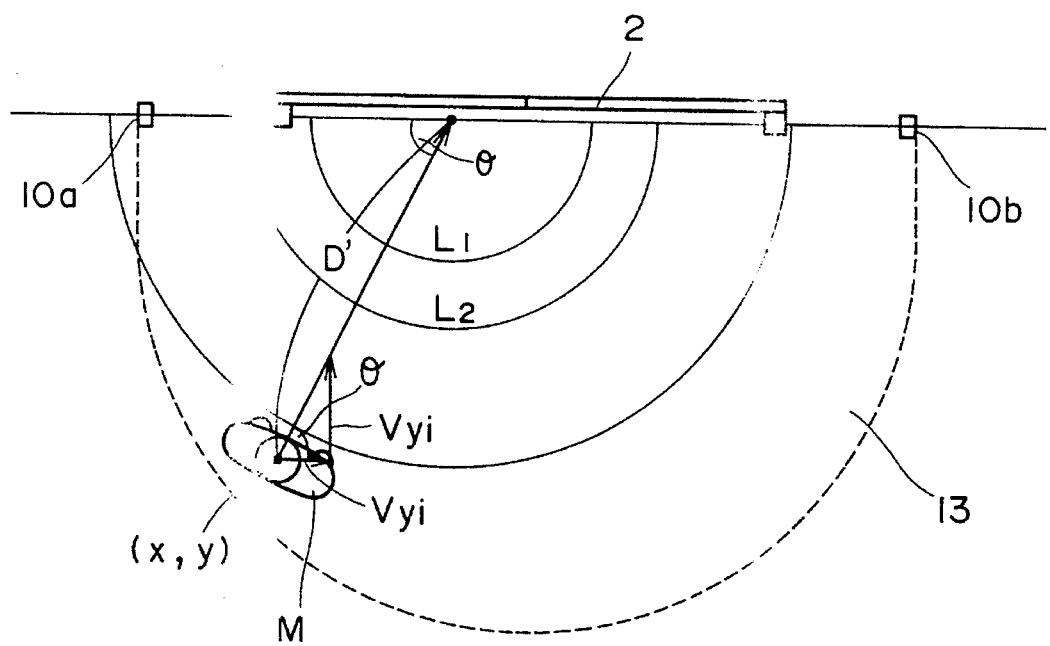
FIG. 8 is a plan view of a modified version of the door opening and closing system according to the first embodiment.

More specifically, as shown in FIG. 8, the tangent θ, where θ is the angle formed between the extension of the line of average moving speed of the object M before it has arrived at the current position (x, y), and the x-axis is $V_{yi}/V_{xi}$. The intersection of the extended line with the x-axis is the predicted arrival point on the door 2 of the object M. The distance D' from this predicted arrival point to the object M can be determined based on the relationship expressed by sin θ=y/D'. That is, D' can be calculated from the following formula (6).

$$D'=y/\sin \theta=y(V_{xi}^2+V_{yi}^2)^{1/2}/V_{yi} \qquad (6)$$

In STEP 24, 26, or 28, it is determined whether or not the distance D' as computed in the above-described manner is a value within the smallest door enabling area L1, the intermediate-sized door enabling area L2, or the largest door enabling area L3. This means that the respective door enabling areas are set, being centered about the predicted arrival point on the door 2 at which the object is considered to arrive. This is illustrated in FIG. 8.

In the second embodiment, too, STEP 16a shown in FIG. 9 may be substituted for STEP 16 in FIG. 3a, and STEP 20a for Step 20 in FIG. 3a, which results in the door enabling area L4 set with the predicted arrival point referenced to as the center of the area L4.

In the examples described thus far, the invention is described on the assumption that only one object M enters the monitoring area 13 at a time. In many cases, however, two or more moving objects, for example, M1 and M2, may simultaneously enter the monitoring area 13 as shown in FIG. 10.

In order to deal with such situations, the system according to the first embodiment may be modified to operate in the following fashion. For example, the predicted arrival points of objects M1 and M2 approaching the door 2 are determined in a manner as described above. Depending on the average moving speeds along the y-axis of the objects M1 and M2, a door enabling area L1, L2, or L3 for the object M1, and a door enabling area L1', L2', or L3' are set, respectively. When either one of the object M1 and M2 arrives at the associated set door enabling area, the door 2 is enabled to open.

Figure 10:
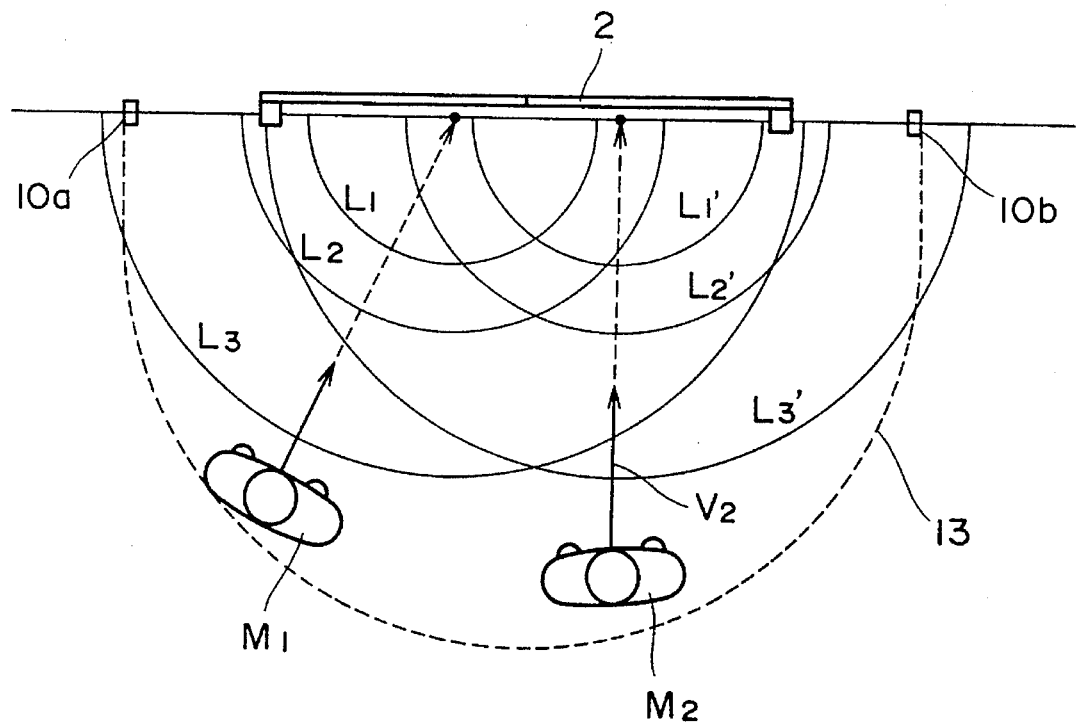
FIG. 10 is a plan view of another modified version of the door opening and closing system according to the first embodiment.

More specifically, in FIG. 10, let it be assumed that the average moving speed along the y-axis of the object M2 is higher than that of the object M1, and that the door enabling area L1 and the door enabling area L3' are set for the objects M1 and M2, respectively. Since the object M2 arrives at the area L3' at a time earlier than the time when the object M1 arrives at the area L1, the door 2 is enabled with such a timing (for the object M2) that the door 2 is fully opened just at the time when the object M2 arrives at the predicted point of the door 2.

The system according to the second embodiment may be modified in a similar manner, by setting the door enabling area L4 for each of the moving objects M1 and M2 centered about the predicted arrival points at the door 2, and enabling the door 2 to open completely at a suitable time for the Object which has arrived at the associated door enabling area L4 earlier.

Alternatively, in the systems according to the first and second embodiments, if plural moving bodies or objects enter the monitoring area 13, the door opening operation may be controlled with reference to that one of the objects which moves at the highest average moving speed along the y-axis.

Signals from the object sensors 10a and 10b provide only coordinates of plural moving objects which enter the monitoring area 13. Assuming, for example, that the coordinates of two objects which have first entered the monitoring area 13 are $(x_{01}, y_{01})$ and $(x_{02}, y_{02})$, and that the coordinates next derived are $(x_{11}, y_{11})$ and $(x_{12}, y_{12})$. It cannot be determined whether the first of the two objects has moved from the point $(x_{01}, y_{01})$ to the point $(x_{11}, y_{11})$ or to the point $(x_{12}, y_{12})$. Similarly, it cannot be determined whether the second one of the objects has moved from the point $(x_{02}, y_{02})$ to the point $(x_{12}, y_{12})$ or to the point $(x_{11}, y_{11})$.

In such a case, the distance between the points $(x_{01}, y_{01})$ and $(x_{11}, y_{11})$ and the distance between the points $(x_{01}, y_{01})$ and $(x_{12}, y_{12})$ are computed and compared with each other. It is, then, assumed that the first one of the two object has moved over the shorter distance. In the illustrated case, the first object is judged to have moved from the point $(x_{01}, y_{01})$ to the point $(x_{11}, y_{11})$. Similarly, the distance between the points $(x_{02}, y_{02})$ and $(x_{12}, y_{12})$ and the distance between the points $(x_{02}, y_{02})$ and $(x_{11}, y_{11})$ are calculated and compared with each other, and it is judged that the second object has moved over the shorter distance. The same processing is taken when the number of moving objects entering the monitoring area increases.

In the system according to the first embodiment, if the object M is moving along the x-axis, the door 2 will not open. There may be a case, however, in which the object moving in parallel with the x-axis suddenly changes its way toward the door 2 just after it has entered the enabling area L1. To deal with such situations, the processing represented by the flow chart shown in FIG. 3 may be modified as follows.

After STEP 16, instead of STEP 18, STEP 20 which is a step for computing the distance D' is carried out, and, then, STEP 18 which is a step for determining the direction of movement of the object is carried out. If it is determined that the moving speed along the y-axis is zero and the object M is not moving toward the door, the processing does not return directly to STEP 4. Instead, the processing returns to STEP 4 only after steps similar to STEPS 28 and 30 are carried out.

The first and second embodiments of the present invention have been described by means of a double panel sliding door, but the present invention can be applied also to other types of doors, such as a single panel sliding door, a double-panel, single-direction sliding door, a four panel sliding door, a single panel swing door, and a double panel swing door.

When a plurality of moving objects enter the monitoring area, it is necessary to compute the coordinates of the respective objects. The computation for the coordinates of plural objects is carried out in the microcomputer 16 or 16a in a manner which can be easily understood by people skilled in the art. Accordingly, no detailed description is given here.

An automatic door opening and closing system according to a third embodiment of the present invention is shown in FIGS. 12a through 14. The system of the third embodiment is for a door including a plurality panels, for example, a four-panel sliding door including four panels 2a, 2b, 2c, and 2d. The automatic door opening and closing system operates to open only that one or more of a plurality of panels at which a moving object M is predicted to arrive at.

The panels 2a through 2d are driven by independent door driving devices 6a, 6b, 6c, and 6d shown in FIG. 13 associated with the respective panels. When the panels 2a and 2b are opened they are driven leftward in FIG. 12a, while the panels 2c and 2d are driven rightward for opening them.

The door driving devices 6a–6d open the associated door panels in response to control signals supplied from a door opening and closing control device 4b, as shown in FIG. 13. The door opening and closing control device 4b is responsive to an open-door command signal provided by a detecting device 8b to provide a control signal to the one of the door driving devices 6a–6d associated with that one of the panels 2a–2d at which the object M is predicted to arrive so that the panel can open at a predetermined speed. The door opening and closing control device 4b provides a control signal to close that panel after a predetermined time lapses from the application of the open-door command signal.

Similar to the detecting device 8 shown in FIG. 1, the detecting device 8b includes object sensors 10a and 10b, which are disposed on opposite sides of the door 2. The sensors 10a and 10b senses a moving object M present in a monitoring area 13b defined by a phantom-line semi-circle 12b and the door panels 2a, 2b, 2c, and 2d, as shown in FIGS. 12a and 12b, and develop sense signals representing the distances of the object M from the respective sensors 10a and 10b.

The sense signals from the sensors 10a and 10b are applied through an amplifier-filter unit 14 and an analog-to-digital converter 15 to a microcomputer 16b, as in the system according to the first embodiment. As in the system of the first embodiment, the microcomputer 16b also operates as a coordinate computing unit 18, a moving speed and direction computing unit 20, a door enabling area selecting unit 24, a distance computing unit 28b, and an open-door command unit 26b. In addition, the microcomputer 16b functions as an arrival point predicting unit 22.

The coordinate computing unit 18 and the moving speed and direction computing unit 20 operate in a similar manner to the corresponding units of the system according to the first embodiment shown in FIG. 2. The coordinate computing unit 18 computes the coordinates A $(x_i, y_i)$ of the object M in accordance with the formulas (1) and (2), and the moving speed and direction computing unit 20 determines the average moving speed $V_{xi}$ along the x-axis and the average moving speed $V_{yi}$ along the y-axis of the object M in accordance with the formulas (3) and (4), and judges the direction of movement of the object M in accordance with, for example, the sign of the computed average moving speeds. In FIG. 12a, the coordinate system has its origin at the location of the object sensor 10a, with its x-axis extending from the sensor 10a through the sensor 10b and with the y-axis extending from the origin perpendicular to the x-axis. Movement of the object M in the direction along the x-axis away from the sensor 10a is positive (+), and movement along the y-axis in the direction away from the panels 2a–2d is positive. The distance of the object M from the sensor 10a is expressed as d1, and the distance from the sensor 10b is expressed as d2.

If the moving speed and direction computing unit 20 determines that the object M is moving toward the panels 2a–2d, it provides a signal indicating it to the arrival point predicting unit 22, which uses the average moving speed $V_{xi}$ along the x-axis and the average moving speed $V_{yi}$ along the y-axis supplied from the unit 20 and signals representative of the coordinates $(x_i, y_i)$ supplied from the coordinate computing unit 18, to predict the panel at which the object M may arrive.

More specifically, the resultant of the average moving speed $V_{yi}$ along the y-axis and the average moving speed $V_{xi}$ along the x-axis at the point $(x_i, y_i)$ is the average moving speed $V_i$ of the object M. The predicted arrival point on the four-panel sliding door 2 at which the object M may arrive is a point C shown in FIG. 12a where the extension of the vector line of the average speed $V_i$ intersects the x-axis, as in the case of FIG. 8. The direction of the extension of the vector of $V_i$ is the average direction of movement of the object M. Since the distance of the object M from the point $(x_i, 0)$ on the x-axis is $y_i$, the distance d of the point C from the point $(x_i, 0)$ is expressed as $y_i \tan \theta$ $(\pi/2-\theta)$, where $\theta$ is the angle formed between this extension of the vector of the speed $V_i$ and the x-axis. Since $\tan \theta$ $(\pi/2-\theta)$ can be expressed by $V_{xi}/V_{yi}$, which is the ratio of the average moving speed $V_{xi}$ along the x-axis to the average moving speed $V_{yi}$ along the y-axis of the object M, the distance d or ordinate of the object M can be determined in accordance with an expression, $y_i*V_{xi}/V_{yi}$. Adding $x_i$, which is the abscissa of the object M, to $y_i*V_{xi}/V_{yi}$ results in the distance D1 of the predicted arrival point C from the origin. In other words, the distance D1 is expressed as follows.

$$D1 = x_i + y_i * V_{xi}/V_{yi} \quad (7)$$

The distances $D_a$, $D_{ab}$, $D_{bc}$, $D_{cd}$, and $D_d$ along the x-axis of the origin-side edge of the panel 2, the boundary between the panels 2a and 2b, the boundary between the panels 2b and 2c, the boundary between the panels 2c and 2d, and the edge remote from the origin of the panel 2d, respectively, from the origin are known. Using these known values, the panel to be opened is determined, and a signal indicating the panel to be opened is applied to the door opening and closing control device 4a.

More specifically, when, for example, the distance D1 is equal to the distance Da or greater, but less than $(D_{ab}-K*w)$, it is determined that the panel 2a should be opened. w is the width of each panel, and K is a coefficient which is greater than 0, but not greater than 1 and is chosen with the safety and the like taken into account. For the distance D1 which is equal to or greater than $(D_{ab}-K*w)$, but less than $(D_{ab}+K*w)$, only the panels 2a and 2b are opened. For D1 equal to or greater than $(D_{ab}+K*w)$, but less than $(D_{bc}-K*w)$, only the panel 2b is to be opened. For D1 equal to or greater than $(D_{bc}-K*w)$, but less than $(D_{bc}+K*w)$, the panels 2b and 2c are determined to be opened. For D1 equal to or greater than $(D_{bc}+K*w)$, but less than $(D_{cd}-K*w)$, only the panel 2c is determined to be opened. If the distance D1 is equal to or greater than $(D_{cd}-K*w)$, but less than $(D_{cd}+K*w)$, the panels 2c and 2d only are to be opened, and if the distance D1 is equal to or greater than $(D_{cd}+K*w)$, but less than $D_d$, it is determined that the panel 2d only should be opened. FIG. 12b illustrates a case in which the distance D1 is equal to or greater than $(D_{ab}+K*w)$, but less than $(D_{bc}+K*w)$ so that only the panel 2b is opened.

The panel(s) to be opened may be determined in the following manner. When the distance D1 is Da or greater, but less than $(D_{ab}+K*w)$, the panels 2a and 2b are opened. When D1 is $(D_{ab}+K*w)$ or greater, but less than $(D_{bc}-K*w)$, the panel 2b only is to be opened. If the distance D1 is equal to or greater than ($D_{bc}$−K*w), but less than ($D_{bc}$+K*w), it is determined that the panels 2b and 2c should be opened. For D1 which is ($D_{bc}$+K*w) or greater, but less than ($D_{cd}$−K*w), the panel 2c is to be opened. If the distance D1 is ($D_{cd}$+K*w) or greater, but less than Dd, it is determined that the panels 2c and 2d should be opened.

Alternatively, when the distance D1 is Da or greater, but less than ($D_{ab}$−K*w), the panels 2a and 2b are opened. When D1 is ($D_{ab}$−K*w) or greater, but less than ($D_{bc}$−K*w), the panel 2b only is to be opened. If the distance D1 is equal to or greater than ($D_{bc}$−K*w), but less than ($D_{bc}$+K*w), it is determined that the panels 2b and 2c should be opened. For D1 which is ($D_{bc}$+K*w) or greater, but less than ($D_{cd}$+K*w), the panel 2c is to be opened. If the distance D1 is ($D_{cd}$−K*w) or greater, but less than $D_d$, it is determined that the panels 2c and 2d should be opened.

In these alternative ways, the outermost panel 2a or 2d is not opened alone. Therefore, these alternatives can avoid the possibility that the panel 2b or 2c might be erroneously driven to move and hurt a person who is passing the door if the panel 2a or 2d alone were opened.

After the predicted arrival point C for the object M is determined in the manner described above, the door enabling area selecting unit 24 selects one of the three concentric door enabling areas L1, L2, and L3 centered about the predicted arrival point C, using the average moving speed $V_{yi}$ along the y-axis supplied from the moving speed and direction computing unit 20. The open-door command unit 26b sets the selected door enabling area afterward.

The sizes of the three door enabling areas L1, L2, and L3 may be the same as those which have been described with reference to the first embodiment, and the basis of the selection may be the same as that used in the first embodiment.

For example, even if it is initially determined that the predicted arrival point C of the object is on the panel 2b, the object M may change its direction of movement, which requires changing the predicted arrival point C from the initially predicted panel to another panel, for example, the panel 2a. In another case, if the average moving speed along the y-axis is initially low so that the smallest door enabling area L1 is set, the object M may increase its average moving speed into the intermediate speed range within the monitoring area 13b afterward, which requires the setting of the intermediate-sized door enabling area L2 anew. In still another case, both the average moving speeds along the y-axis and x-axis may simultaneously change, which requires alteration of both of the predicted arrival point C and the door enabling area. In order to deal with situations like the ones described above, the determination of the predicted arrival point C and the selection of an appropriate door enabling area are done each time the computation of the coordinates of the object M within the monitoring area 13b is carried out.

After the selection of an appropriate one of the door enabling areas, the open-door command unit 26b determines whether the object M is in the selected door enabling area. For that purpose, the distance computing unit 28 uses a signal representing the ordinate $y_i$ of the object M supplied from the coordinate computing unit 18, and the average moving speeds $V_{xi}$ and $V_{yi}$ along the x-axis and y-axis, respectively, supplied from the moving speed and direction computing unit 20, in order to determine the distance D2 of the object M from the predicted arrival point C. As will be understood from FIG. 12b, the distance D2 is determined by dividing the ordinate $y_i$ of the object M by $\cos(\pi/2-\theta)$ which, in turn, is $V_{xi}/(V_{yi}+V_{xi})^{1/2}$. Thus, the distance D2 is:

$$D2 = y_{i/[V_{xi}/(V_{yi}+V_{xi})^{1/2}]} \qquad (8)$$

Alternatively, D2 can be determined by $D/\sin(\pi/2-\theta)$.

The open-door command unit 26b judges whether the distance D2 determined in the manner described above is a value within the set door enabling area or not. If the distance D2 is a value within the set door enabling area, an open-door command signal is applied to the door opening and closing control device 4b. The manner of judgment may be the same as employed in the first embodiment.

The door opening and closing control device 4b is responsive to the open-door command signal applied to it, and applies a control signal to that one of the door driving devices 6a–6d which drives the panel determined by the arrival point predicting unit 22, so that the panel is opened at a fixed speed.

Thus, the panel on which the predicted arrival point is located (hereinafter sometimes referred to predicted panel) starts opening at the fixed speed when the object M, whichever speed it is moving, a high, intermediate, or low speed, arrives at a position corresponding to the average moving speed along the y-axis. More specifically, if the object M is moving at a high average moving speed along the y-axis, the predicted panel starts opening at the fixed speed when the object M arrives at the largest door enabling area L3 which is the remotest from the predicted arrival point C. When the object M is moving at an intermediate average moving speed along the y-axis, the predicted panel starts opening at the fixed speed when the object M arrives at the intermediate-sized door enabling area L2. Similarly, if the object M is moving at a low average moving speed along the y-axis, the predicted panel starts opening at the fixed speed when the object M arrives at the smallest door enabling area L1. The fixed speed at which the door is opened is determined such that the door (panel) is opened in the time required for the object M to arrive at the predicted arrival point C from each of the door enabling areas.

Thus, at the same time as the object M arrives at the predicted panel, the opening of the panel is completely, and it never happens that the predicted panel is closed even when the object M arrives at it, or that the predicted panel was opened some time before the object M arrives at it. Thus, the object can pass through the door without being hindered by the door, and the air-conditioning efficiency is never degraded. Furthermore, not all panels are driven to open, but only the predicted panel alone or together with its adjacent panel are opened, the air-conditioning efficiency is much less degraded.

The microcomputer 16b functions as the coordinate computing unit 18, the moving speed and direction computing unit 20, the arrival point predicting unit 22, the door enabling area selecting unit 24, the open-door command unit 26b, and the distance computing unit 28. These functions are described with reference to the flow chart shown in FIGS. 14a and 14b.

Figure 14A:
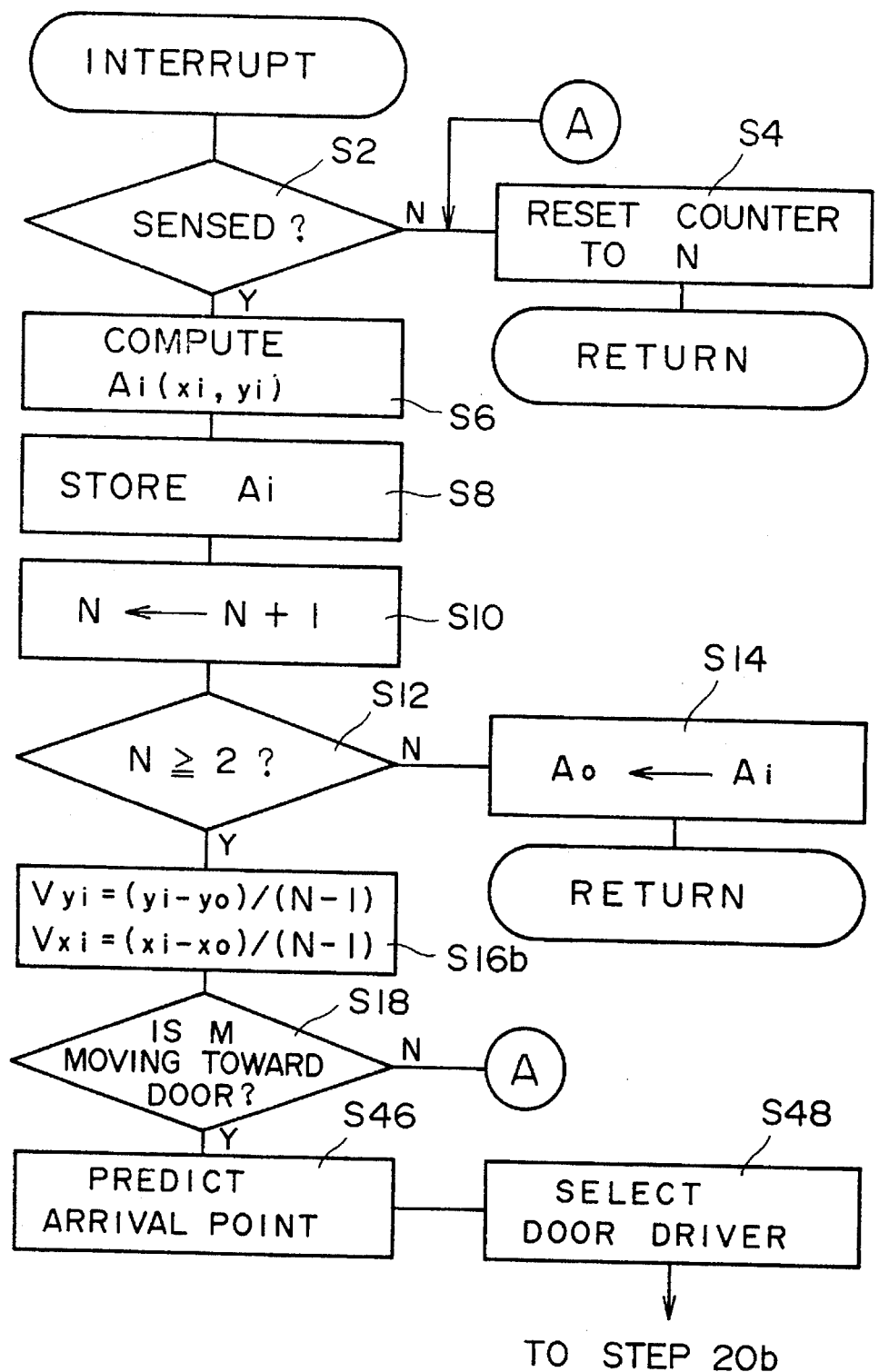
FIG. 14a and 14b show a flow chart of the operation of the system shown in FIGS. 12a and 12b.
Figure 14B:
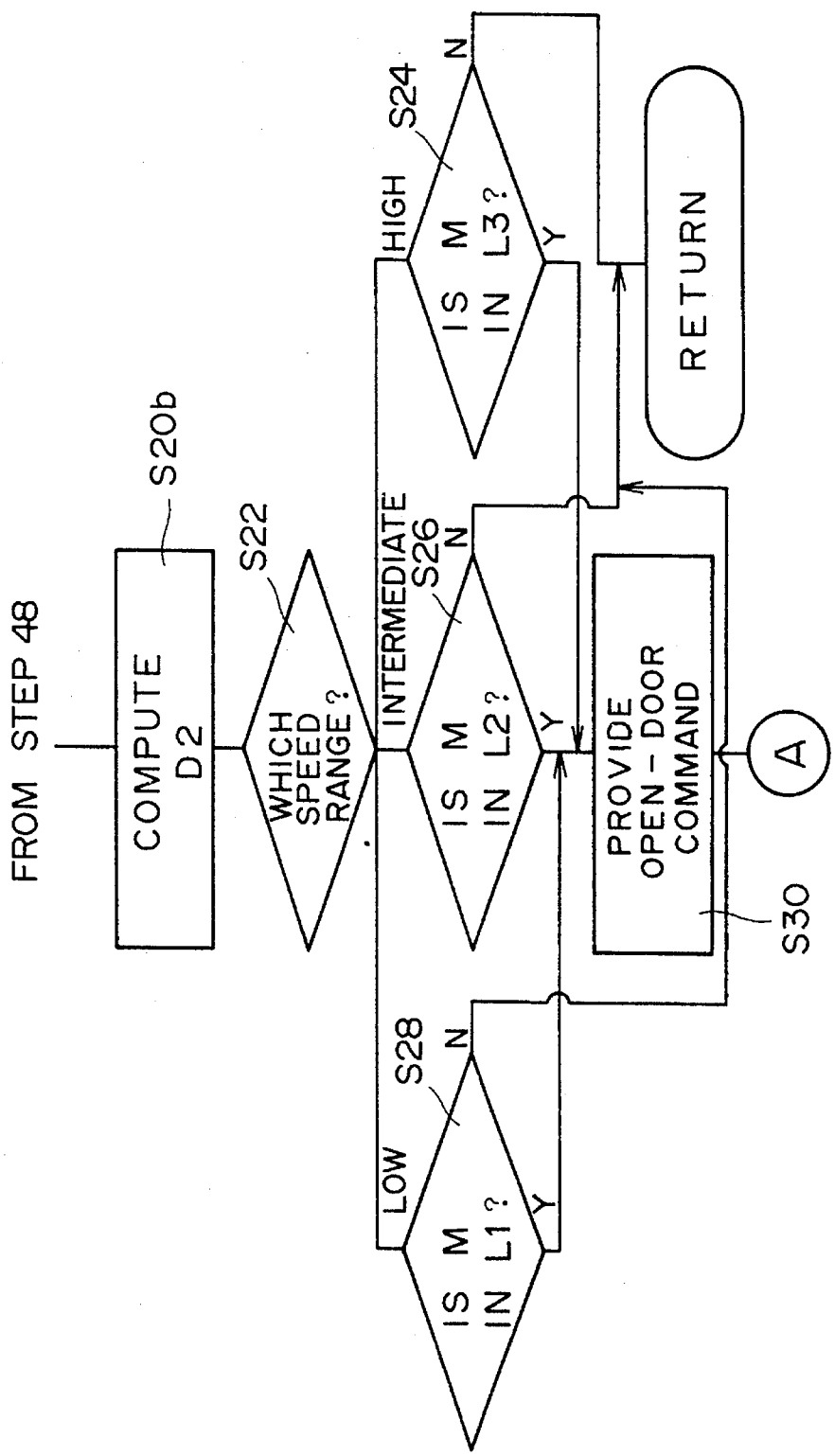

Similar to the routine shown in FIGS. 3a and 3b, the routine shown in FIGS. 14a and 14b are an interruption routine, which is executed in response to an interruption signal generated every 0.1 second, for example, by the interruption signal generator 17. This routine is not executed if the open-door command signal has been applied to the door opening and closing control device 4b.

STEP 2 through STEP 18 of this routine are similar to STEP 2 through STEP 18 of the routine shown in FIGS. 3a and 3b, except STEP 16b. In STEP 16b, both the average moving speed $V_{yi}$ along the y-axis and the average moving speed $V_{xi}$ along the x-axis are determined. Thus, STEP 6 is equivalent to the coordinate computing unit 18, and STEPS 8, 10,. 12, 14, 16b, and 18 provide the moving speed and direction computing unit 20.

If the object M is judged to be approaching the panels 2a–2d in STEP 18, i.e. the answer to the question in STEP 18 is YES, the arrival point of the object M is predicted (STEP 46). The prediction is done in accordance with the formula (7). On the basis of the predicted arrival point determined, one of the door driving devices 6a–6d is selected, and a signal indicating the selected door is applied to the door opening and closing control device 4b (STEP 48). The selection of the door driving device is done, using the predicted arrival point, the positions of the panel boundaries, $D_{ab}$, $D_{bc}$, and $D_{cd}$, and the width w or each panel, as described previously. Thus, STEPS 46 and 48 provide the function of the arrival point predicting unit 22.

Next, the distance D2 of the object M from the predicted arrival point C is computed, using the formula (8) (STEP 20b).

Following STEP 20b, as in the first embodiment, it is determined which one of the high, intermediate, or low speed range, the average moving speed $V_{yi}$ along the y-axis as determined in STEP 16b is in (STEP 22).

If the average moving speed $V_{yi}$ is determined to be high, whether the distance D2 as computed in STEP 20b has a value within the largest door enabling area L3 or not is determined (STEP 24). If the average moving speed is judged to be intermediate, whether the distance D2 has a value within the intermediate-sized door enabling area L2 or not is determined (STEP 26). Similarly, for the low distance D2, it is determined whether the average moving speed has a value within the smallest door enabling area L1 or not (STEP 28).

Thus, the door enabling area with which the distance D2 is compared is altered in accordance with the speed as judged in STEP 22. Then, STEP 22 is equivalent to the door enabling area selecting unit 24. If the distance D2 has a value in the door enabling area with which it has been compared, i.e. the answer to the question in STEP 24, 26, or 28 is YES, an open-door command signal is applied to the door opening and closing control device 4b (STEP 30), and the counter N is reset in STEP 4. Then, the processing returns to the main routine. On the other hand, if the distance D2 does not have a value in the door enabling area with which it has been compared, i.e. if the answer to the question in STEP 24, 26, or 28 is NO, the processing immediately returns to the main routine.

The execution of STEP 30 causes the door opening and closing control device 4b to provide a control signal to the door driving device selected in STEPS 46 and 48. This causes the predicted panel(s) to start opening.

When it is determined that the object M is not in the set door enabling area in STEP 24, 26, or 28, the processing returns. Then, 0.1 second after, the processing is repeated, starting from STEP 2, and the average moving speed along the y-axis and the predicted arrival point C of the object M are computed, using the current coordinates of the object M. A new door enabling area is then set on the basis of the computed average moving speed along the y-direction and the predicted arrival point C, and, then, the determination of whether the object M is in the newly set door enabling area or not is made. The locations of the door enabling areas and the door enabling area to be selected are not fixed, but they are determined in accordance with the average moving speed and direction.

As described above, STEPS 24, 26, 28 and 30 determine whether the object M is within the set door enabling area, and provide an open-door command signal to the door opening and closing control device 4b when the object M is in the set door enabling area. Thus, these STEPS provide the function of the open-door command unit 26. STEPS 22 through 30 provide the function of the open-door signal output means.

Figure 15:
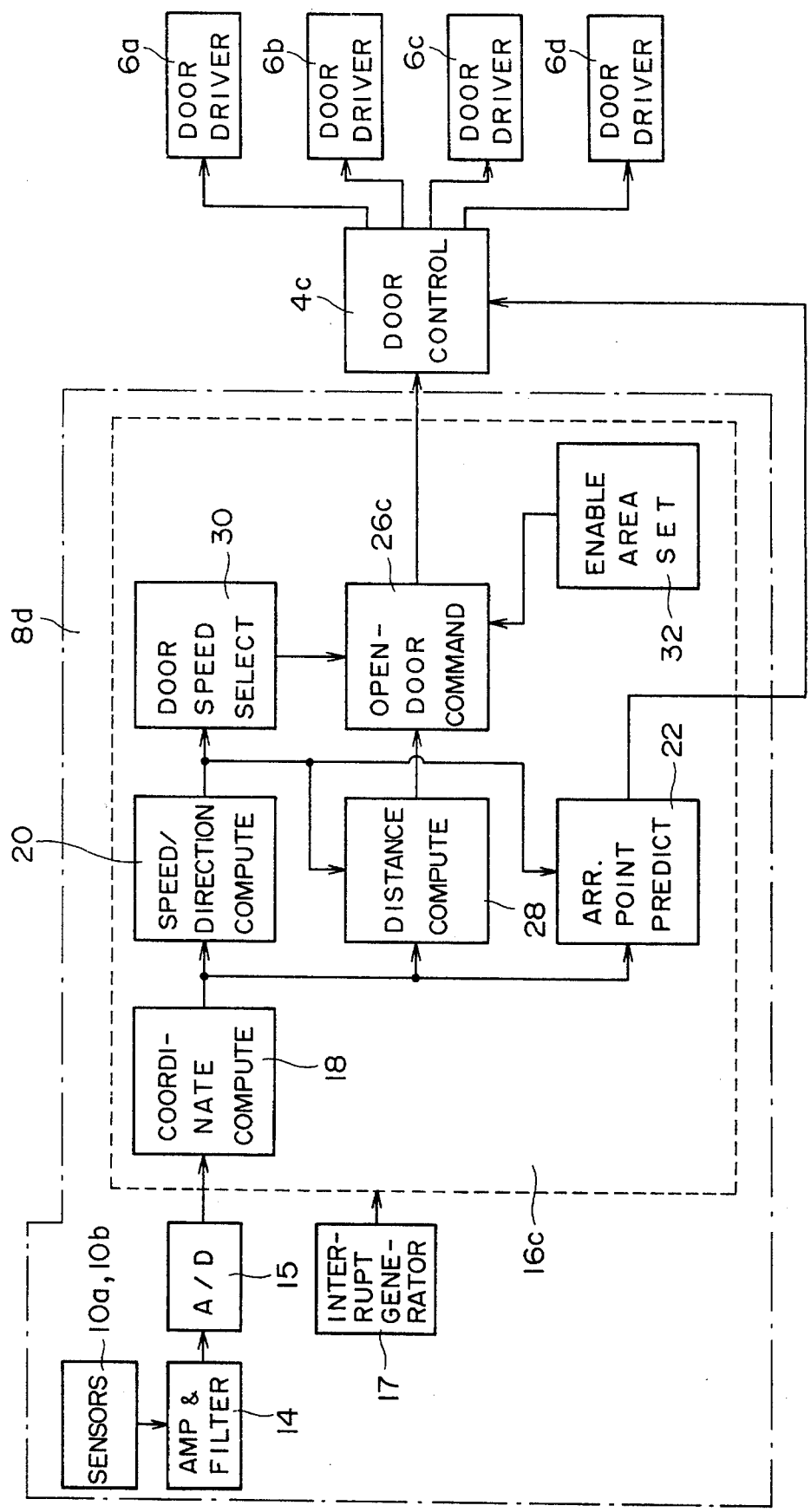
FIG. 15 is a block diagram of an automatic door opening and closing system according to a fourth embodiment of the present invention.

An automatic door opening and closing system according to a fourth embodiment of the present invention is shown in FIGS. 15 and 16. As shown in FIG. 16, according to the fourth embodiment, a semicircular door enabling area L4 is set, being centered about a predicted arrival point C on the door of a moving object M. The door enabling area L4 is smaller than a monitoring area 13c and has a radius of, for example, 1.2 m. Depending on the average moving speed of the object M at the time when it arrives at the door enabling area L4, the speed at which the panel with the point C located thereon is to be opened is changed such that the panel is fully opened simultaneously with the arrival of the object M at the door (panel).

As shown in FIG. 15, the automatic door opening and closing system according to the fourth embodiment, too, includes a door opening and closing control device 4c, and door driving devices 6a, 6b, 6c, and 6d. When a high-speed open-door command signal is applied from an open-door command unit 26c, in order to open, at a high speed, the panel (hereinafter sometimes referred to as "predicted panel") at which the object M is predicted to arrive, the door opening and closing control system 4c operates to control the door driving device associated with the predicted panel. If an intermediate speed open-door command signal is applied, the door opening and closing control device 4c controls an appropriate door driving device to drive to open the predicted panel at an intermediate speed. If a low speed open-door command signal is applied, the door opening and closing control device 4c controls an appropriate door driving device to drive to open the predicted panel at a low speed. The open-door command signal is applied when the object M enters the door enabling area L4.

A detecting device 8c providing the above-described open-door command signal is similar to the detecting device 8b of the system according to the third embodiment, and includes object sensors 10a and 10b, an amplifier-filter unit 14, an A/D converter 15, a microcomputer 16c, and an interruption signal generator 17.

The microcomputer 16c, like the microcomputer 16b of the third embodiment, provides functions of a coordinate computing unit 18, a moving speed and direction computing unit 22, and a distance computing unit 28. Thus, a speed and direction of movement of the object M at its current position, a predicted arrival point at the door of the object M, and a distance of the object M from the predicted arrival point are computed at intervals of, for example, 0.1 second.

In place of the door enabling area selecting unit 24 of the microcomputer 16b, a door-opening speed selecting unit 30 is employed. The unit 30 selects one of high, intermediate, and low speeds for opening the panel, depending on the average moving speed along the y-axis of the object M as computed in the moving speed and direction computing unit 20.

The open-door command unit 26c compares the value of the radius of the door enabling area L4, supplied from a door enabling area setting unit 32, with the distance of the object M from the predicted arrival point, supplied from the distance computing unit 28, to thereby determine whether the object M has arrived at the door enabling area L4 or not.

If the object M has arrived at the area L4, the open-door command unit 26c applies to the door opening and closing control device 4c, an open-door command signal to cause the panel to be opened at the speed selected in the door-opening speed selecting unit 30. That is, a high speed open-door command signal, an intermediate speed open-door command signal, or a low speed open-door command signal is applied to the device 4c.

If the object M enters the monitoring area 13c at a low average moving speed along the y-axis, the low door-opening speed should be employed. If, however, the object M increases its average moving speed along the y-axis later, the intermediate door-opening speed may be a suitable speed. Accordingly, if the door-opening speed to be employed is determined when the object M is at the outer edge of the monitoring area 13c, and if the speed of the object M changes in the monitoring area 13c, it could occur that the predicted panel is not open when the object M arrives at it, or that the panel is open long before the object M arrives at the panel. However, according to the fourth embodiment of the present invention, since the door opening speed is selected in accordance with the average moving speed along the y-axis computed every 0.1 second, even if the average moving speed of the object M changes in the monitoring area, the door is full open at the time the object arrives at the predicted panel. Furthermore, all the panels of the door are not opened, but one or adjacent ones of the panels only are opened, so that the air-conditioning efficiency is not degraded.

The processing executed in the microcomputer 16c to provide the functions of the coordinate computing unit 18, the moving speed and direction computing unit 20, the arrival point predicting unit 22, and the distance computing unit 28 is the same as the processing described with reference to STEPS 2, 4, 6, 8, 10, 12, 14, 16b, 18, 46, and 48 shown in and described with reference to FIG. 14a. Further, the processing executed in the microcomputer 16c to provide the functions of the door-opening speed selecting unit 30 and the open-door command unit 26c is the same as shown in and described with reference to FIG. 6 in connection with the second embodiment. The processing executed in STEPS 34, 36, 38, and 40 provides the function of the unit 30, and the processing executed in STEPS 42 and 44 provides the function of the open-door command unit 26c.

Figure 17A:
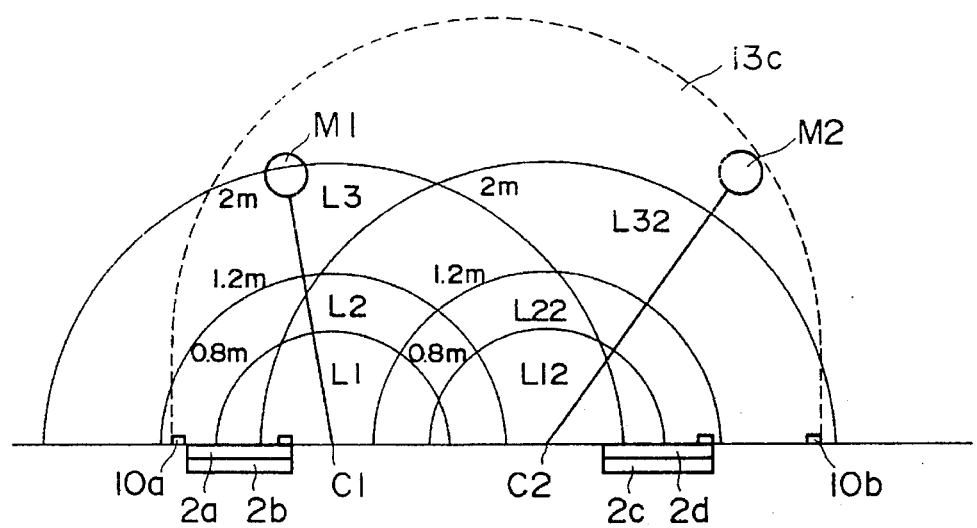
FIG. 17a shows a modified version of the door opening and closing system according to the third embodiment, in which two moving objects are approaching different door panels.
Figure 17B:
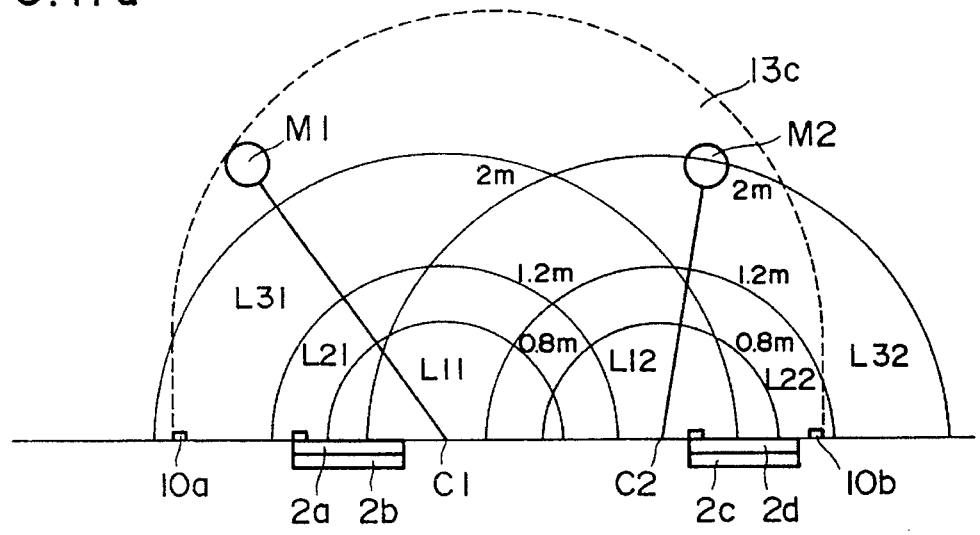
Figure 17C:
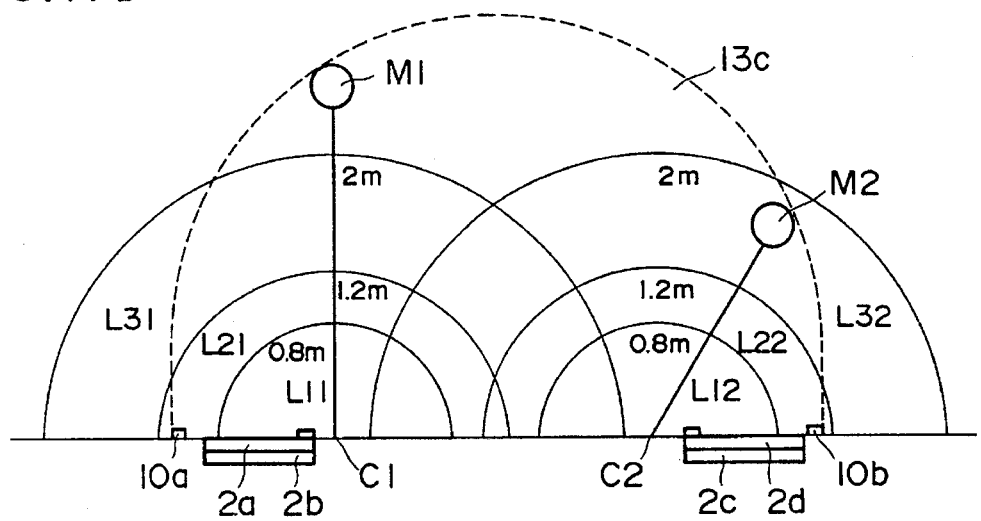
FIG. 17c shows the door opening and closing system corresponding to the ones shown in FIG. 17a and FIG. 17b, in which, however, two moving objects are approaching different door panels which are different from the panels shown in FIG. 17a and FIG. 17b.

The automatic door opening and closing systems of the third and fourth embodiments have been described by means of examples in which only one object M enters into the monitoring area. However, a plurality of objects, such as objects M1 and M2, as shown in FIGS. 17a, 17b and 17c, may enter the monitoring area 13b or 13c at a time. According to the third embodiment, in such a case, the arrival points C1 and C2 of the objects M1 and M2 may be predicted respectively, in the same manner as described above. Then, for the object M1, one of the door enabling areas L11, L21, and L31 is set around the predicted arrival point C1 depending on the average moving speed along the y-axis of the object M1. For the object M2, one of another door enabling areas L12, L22, and L32 of the same sizes as L11, L21, and L31 is set around the predicted arrival point C2 depending on the average moving speed along the y-axis of the object M2. Upon arrival of the respective objects M1 and M2 at the associated set door enabling areas, only selected one(s) of the predicted panels are opened.

Referring to FIG. 17a, the predicted arrival point C1 of the object M1 is near the boundary between the panels 2a and 2b in their closed position. Therefore, if the object M continues to advance in the same direction, both panels 2a and 2b are opened. The predicted arrival point C2 of the object M2 is near the center of the panel 2c in its closed position. Therefore, if the object M2 continues to move in the same direction, the panel 2c will be opened.

In the case shown in FIG. 17b, the predicted arrival point C1 of the object M1 is at substantially the center of the panel 2b in its closed position, the panel 2b will be opened if the object M1 moves in the same direction. The predicted arrival point C2 of the object M2 is in the vicinity of the boundary between the panels 2c and 2d in their closed position, and, therefore, the panels 2c and 2d both are opened if the object M2 advances in the same direction.

In FIG. 17c, the object M1 is predicted to arrive at the boundary between the panels 2a and 2b in their closed position, and, therefore, if the object M1 continues to advance in the same direction, both panels 2a and 2b will be opened. Similarly, if the object M2 advances in the same direction, both panels 2c and 2d will be opened, since the predicted arrival point C2 of the object M2 is in the vicinity of the boundary of the panels 2c and 2d in their closed position.

It should be noted that the described fourth embodiment, too, can be modified such that an independent single door enabling area L4 may be set around the predicted arrival point of each of a plurality of moving objects, and the panel or panels for each of the predicted arrival points may be opened at a speed corresponding to the speed of movement of that object.

Figure 11:
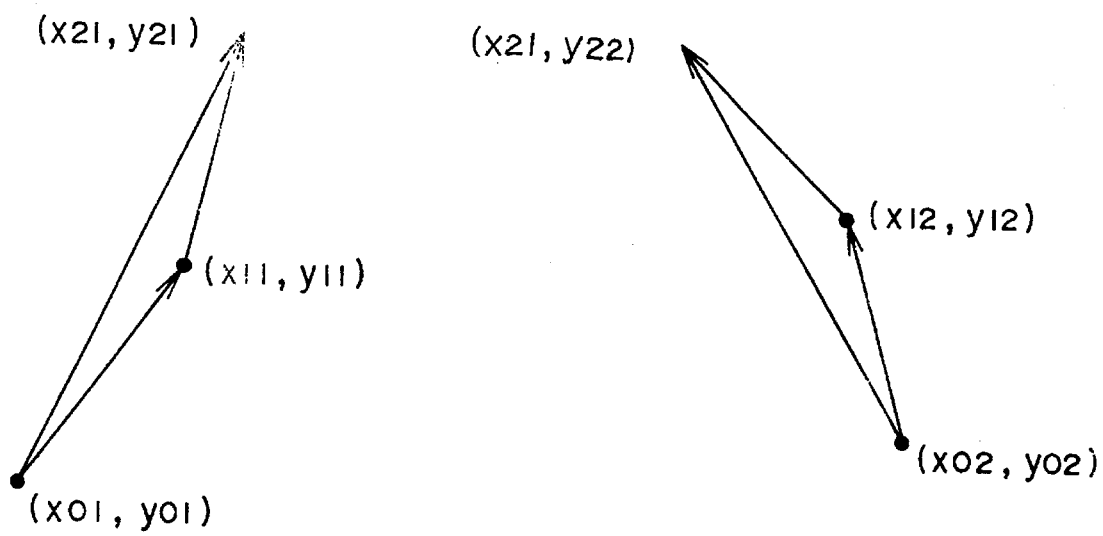
FIG. 11 illustrate how the coordinates of the positions of a plurality of moving objects are determined in the system shown in FIG. 10.

When a plurality of objects enter the monitoring area 13, signals from the object sensors 10a and 10b only provide coordinates of the respective moving objects. In such a case, a processing similar to the one described with reference to FIG. 11 is employed to determine in which ways the respective objects have moved.

Although the third and fourth embodiments of the present invention have been described by means of a four-panel sliding door in which the four panels are driven by associated door driving devices, but other types of doors which include a plurality of panels driven independent of each other may be used.

In addition, although the present invention has been described by means of embodiments which use ultrasonic sensors as the object sensors 10a and 10b, but other types of object sensors, such as CCD cameras, infra-red detectors, etc. can be used instead.

What is claimed is:

1. An automatic door opening and closing system in which a door is driven to open and close by means of door driving means, said system comprising:

moving speed and direction computing means for computing speed and direction of movement of an object moving in a monitoring area outside a door enabling area set in the vicinity of the door through which said object may pass, the speed and direction of movement of the object being computed on the basis of changes in position of the object in said monitoring area; and OPEN-DOOR signal output means for outputting an OPEN-DOOR signal for causing said door to be opened to said driving means in accordance with the result of the computation of the moving speed of the object made at the time when the object arrives at said door enabling area by said moving speed and direction computing means so that the door is fully opened when the object arrives at the door.

2. An automatic door opening and closing system in which a door is driven to open and close by means of door driving means, said system comprising:

moving speed and direction computing means for computing speed and direction of movement of an object moving in a monitoring area set in the vicinity of the door through which said object may pass, the speed and direction of movement of the object being computed on the basis of changes in position of the object in said monitoring area; and signal output means for outputting a signal when it is determined that the object is moving toward the door based on the computation of the direction of movement of the object as computed in said moving speed and direction computing means; and OPEN-DOOR signal output means for setting at least one door enabling area when said signal output means outputs said signal, and outputting an OPEN-DOOR signal to cause said door to be opened to said door driving means in accordance with the moving speed of the object at the time when the object arrives at said door enabling area, as computed by said moving speed and direction computing means, so that said door can be fully opened upon the predicted arrival of the object at the door.

3. The automatic door opening and closing system according to claim 2 wherein said OPEN-DOOR signal output means sets said door enabling area remoter from the door as the moving speed toward said door of the object is higher in said monitoring area, and outputting said OPEN-DOOR signal upon the arrival of the object at the set door enabling area.

4. The automatic door opening and closing system according to claim 3 wherein:

a plurality of door enabling areas are set, being spaced from each other in the direction away from the door;

a reference range of speeds is set for each of said door enabling areas; and each time said speed of movement of the object in said monitoring area is computed in said moving speed and direction computing means, said OPEN-DOOR signal output means selects one of said reference range of speeds in accordance with the result of comparison of the computed speed of movement with the respective ones of said reference ranges of speeds.

5. The automatic door opening and closing system according to claim 2 wherein a single door enabling area is set spaced from the door, and said OPEN-DOOR signal output means sets a higher door-opening speed at which the door is opened, as the object moves toward said door at a higher speed, and outputs said OPEN-DOOR signal to open said door at said set door-opening speed when the object arrives at said single door enabling area.

6. The automatic door opening and closing system according to claim 5 wherein a plurality of door-opening speeds are set, and a plurality of reference ranges of speeds of the object are set for the respective ones of said plurality of door-openings speeds;

said OPEN-DOOR signal output means comparing the speed of movement of the object in said monitoring area with said reference ranges of speeds each time said speed of movement of the object in said monitoring area is computed.

7. The automatic door opening and closing system according to claim 2 wherein:

said OPEN-DOOR signal output means comprises means for setting a door enabling area corresponding to said speed of movement of the object, and means for outputting said OPEN-DOOR signal to cause said door to be opened at a fixed speed, when the object arrives at said set door enabling area; and said system further comprises means for operating said moving speed and direction computing means, said signal output means, and said OPEN-DOOR signal output means at predetermined time intervals.

8. The automatic door opening and closing system according to claim 2 wherein:

only one door enabling area is set;

said OPEN-DOOR signal output means comprises means for selecting a speed at which said door is to be opened, in accordance with the speed of movement of the object, and means for outputting an OPEN-DOOR signal for opening said door at the selected speed when the object arrives at said door enabling area; and said system further comprises means for operating said moving speed and direction computing means, said signal output means, and said OPEN-DOOR signal output means at predetermined time intervals.

9. The automatic door opening and closing system according to claim 2 in which said door comprises a plurality of panels driven by associated driving means;

wherein said system further comprises predicting means for utilizing the computation of the direction of movement as computed in said moving speed and direction computing means to predict one of said plurality of panels at which the object will arrive;

at least one door enabling area is set in the vicinity of the panel predicted by said predicting means; and said OPEN-DOOR signal output means provides an OPEN-DOOR signal to said driving means for said predicted panel when the object arrives at said door enabling area, so that said predicted panel can be fully opened upon the arrival of the object at said predicted panel from said door enabling area.

10. An automatic door opening and closing system in which a door comprises a plurality of panels driven to open and close by associated driving means, said system comprising:

moving speed and direction computing means for computing the direction and speed of an object based on changes in position of the object;

predicting means utilizing the computation of the direction of movement of the object as computed in said moving direction computing means to predict the panel at which the object will arrive; and OPEN-DOOR signal output means for providing an OPEN-DOOR signal to said door driving means for said predicted panel predicted by said predicting means.

* * * * *